US008439376B2

(12) United States Patent
Willis et al.

(10) Patent No.: US 8,439,376 B2
(45) **Date of Patent: *May 14, 2013**

(54) MOBILE SUPPORT ASSEMBLY

(75) Inventors: Phillip Minyard Willis, Alpharetta, GA (US); Randy Bernard, Atlanta, GA (US)

(73) Assignee: AMG Medical, USA., Alpharetta, GA (US)

( * ) Notice: Subject to any disclaimer, the term of this patent is extended or adjusted under 35 U.S.C. 154(b) by 139 days.

This patent is subject to a terminal disclaimer.

(21) Appl. No.: 12/953,044

(22) Filed: Nov. 23, 2010

(65) Prior Publication Data

US 2011/0140394 A1 Jun. 16, 2011

Related U.S. Application Data

(63) Continuation-in-part of application No. 12/082,814, filed on Apr. 14, 2008, now Pat. No. 7,837,208, which is a continuation-in-part of application No. 11/981,515, filed on Oct. 31, 2007, now abandoned, which is a continuation-in-part of application No. 11/581,762, filed on Oct. 16, 2006, now abandoned, which is a continuation-in-part of application No. 11/343,299, filed on Jan. 31, 2006, now Pat. No. 7,540,527, which is a continuation-in-part of application No. 11/129,569, filed on May 13, 2005, now Pat. No. 7,066,484, which is a continuation of application No. 10/680,596, filed on Oct. 7, 2003, now Pat. No. 7,073,801.

(51) Int. Cl.
*B62M 1/00* (2010.01)

(52) U.S. Cl.
USPC .... 280/87.021; 280/642; 280/647; 280/87.05

(58) Field of Classification Search ............. 280/87.021, 280/87.05, 642, 647, 87.041, 650, 47.38, 280/658; 135/66, 67, 74
See application file for complete search history.

(56) References Cited

U.S. PATENT DOCUMENTS

| | | | |
|---|---|---|---|
| 2,462,560 | A | 2/1949 | Schmidt |
| 2,630,128 | A | 3/1953 | Slater |
| 2,685,325 | A | 8/1954 | Webster |
| 2,866,495 | A | 12/1958 | Diehl et al. |
| 2,872,967 | A | 2/1959 | Kirkpatrick |
| 2,899,968 | A | 8/1959 | Reichenbach |

(Continued)

FOREIGN PATENT DOCUMENTS

| | | | |
|---|---|---|---|
| CA | 2 471 692 | A1 | 4/2005 |
| CA | 2 517 117 | A1 | 8/2005 |

(Continued)

*Primary Examiner* — Hau Phan
(74) *Attorney, Agent, or Firm* — Malloy & Malloy, P.L.

(57) ABSTRACT

A mobile support assembly disposable between a stored orientation and an operative orientation including a frame having a front leg assembly including a pair of front legs, and a rear leg assembly including a pair of rear legs. At least one but preferably each of the front and rear leg assemblies include at least one cross member spanning the corresponding legs thereof. Each cross member is structured to have a variable length so as to effectively vary an overall width of the mobile support assembly and thereby facilitate a compact configuration of the frame when in the stored orientation. Further, at least one of the leg assemblies includes a lower portion wherein the wheels are included, the lower portion disposable into a non-operative storage position that at least partially defines a reduced longitudinal dimension of the frame when in the stored orientation.

10 Claims, 32 Drawing Sheets

U.S. PATENT DOCUMENTS 2,902,592 A 9/1959 Cole et al.
2,907,372 A 10/1959 Leger
2,910,995 A 11/1959 Jacuzzi
3,194,577 A 7/1965 Berlin
3,237,940 A 3/1966 Johnson
3,273,888 A 9/1966 Burns
3,354,893 A 11/1967 Schmerl
3,467,117 A 9/1969 Lucibello
3,516,425 A 6/1970 Rigal
3,690,652 A 9/1972 Schneider et al.
3,759,544 A 9/1973 Korpela
3,778,052 A 12/1973 Andow et al.
RE28,067 E 7/1974 Hyman
3,840,034 A 10/1974 Smith
3,963,037 A 6/1976 Clark
4,018,440 A 4/1977 Deutsch
4,046,374 A 9/1977 Breyley
4,056,115 A 11/1977 Thomas
4,094,330 A * 6/1978 Jong .............................. 135/67
4,159,110 A 6/1979 Dodenhoff
4,164,354 A 8/1979 Rodaway
4,187,869 A 2/1980 Marchetti
4,211,309 A 7/1980 Ruggiero
4,211,426 A 7/1980 Motloch
4,251,105 A 2/1981 Barker
4,277,100 A 7/1981 Beougher
4,341,381 A 7/1982 Norberg
4,342,465 A 8/1982 Stillings
4,384,713 A 5/1983 Deutsch et al.
4,387,891 A 6/1983 Knochel
4,411,283 A 10/1983 Lucarelli
4,449,732 A 5/1984 Surot
4,461,471 A 7/1984 Brastow
4,510,956 A 4/1985 King
4,518,002 A 5/1985 Battiston, Sr. et al.
4,527,579 A 7/1985 Knotter et al.
4,640,301 A 2/1987 Battiston, Sr. et al.
4,648,619 A 3/1987 Jungnell et al.
D289,507 S 4/1987 Danielsson
D291,791 S 9/1987 Bean
4,700,730 A 10/1987 Samuelson et al.
D293,663 S 1/1988 Erfurth
4,730,842 A 3/1988 Summers et al.
4,765,355 A 8/1988 Kent
4,805,931 A 2/1989 Slasor
4,809,725 A 3/1989 Champigny
4,869,280 A 9/1989 Ewing
4,907,794 A 3/1990 Rose
4,932,090 A 6/1990 Johansson
D310,646 S 9/1990 Rose
4,962,781 A 10/1990 Kanbar
D312,061 S 11/1990 Smith
4,989,890 A 2/1991 Lockard et al.
4,995,412 A * 2/1991 Hirn et al. ....................... 135/67
5,011,104 A 4/1991 Fang
5,020,560 A 6/1991 Turbeville
5,046,748 A 9/1991 Oat-Judge
5,060,967 A 10/1991 Hulterstrum
5,072,958 A 12/1991 Young
5,133,377 A 7/1992 Truxillo
5,139,040 A 8/1992 Kelly
D329,833 S 9/1992 Andersson et al.
5,172,715 A 12/1992 Webb
5,217,419 A 6/1993 Harwood
5,224,717 A 7/1993 Lowen
5,244,225 A 9/1993 Frycek
5,261,682 A 11/1993 Chuang
5,265,969 A 11/1993 Chuang
5,275,187 A * 1/1994 Davis .............................. 135/67
5,301,970 A 4/1994 Haskins
5,320,122 A 6/1994 Jacobson, II et al.
5,348,336 A 9/1994 Fernie et al.
5,364,120 A 11/1994 Shimansky
5,380,262 A 1/1995 Austin
5,409,028 A 4/1995 Lee
5,417,472 A 5/1995 Elvinsson
5,419,571 A 5/1995 Vaughan
D360,174 S 7/1995 Kjell et al.
5,451,193 A 9/1995 Pickard
5,482,070 A 1/1996 Kelly
D367,833 S 3/1996 Ahlbertz
5,558,358 A 9/1996 Johnson
5,586,352 A 12/1996 O'Brien et al.
5,603,517 A 2/1997 Lorman
5,605,345 A 2/1997 Erfurth et al.
5,647,602 A 7/1997 Nevin
5,664,460 A 9/1997 Hewson
5,687,984 A 11/1997 Samuel
5,692,762 A 12/1997 Obitts
5,702,326 A 12/1997 Renteria
5,716,063 A 2/1998 Doyle et al.
5,743,545 A 4/1998 Kunze et al.
5,772,234 A 6/1998 Luo
5,845,664 A 12/1998 Ryder et al.
5,865,065 A 2/1999 Chiu
5,865,457 A 2/1999 Knabusch et al.
5,878,625 A 3/1999 Hu
5,896,779 A 4/1999 Biersteker et al.
6,085,766 A 7/2000 Geary
6,196,568 B1 3/2001 Stevens
6,311,708 B1 11/2001 Howle
6,338,493 B1 1/2002 Wohlgemuth et al.
6,374,841 B1 4/2002 Yamamoto et al.
6,378,883 B1 4/2002 Epstein
6,446,990 B1 9/2002 Nania et al.
6,481,730 B2 11/2002 Sung
6,494,469 B1 12/2002 Hara et al.
6,516,821 B1 2/2003 Uemura
D481,336 S 10/2003 Wu
6,659,478 B2 12/2003 Hallgrimsson et al.
6,688,633 B2 2/2004 van't Schip
6,695,324 B1 2/2004 Wu
6,729,342 B2 5/2004 Serhan
6,834,660 B1 12/2004 Van Wart, Jr.
6,837,503 B2 1/2005 Chen et al.
6,854,754 B1 2/2005 Easley, Jr.
6,860,504 B2 * 3/2005 Suga et al. .................... 280/642
6,863,296 B2 3/2005 Yoshie et al.
6,877,519 B2 4/2005 Fink
6,886,575 B2 5/2005 Diamond
6,913,279 B1 7/2005 Opalka et al.
7,011,335 B2 3/2006 Kight
7,040,637 B2 5/2006 Owens
7,052,030 B2 5/2006 Serhan
7,066,484 B2 6/2006 Willis et al.
7,073,801 B2 7/2006 Sanders et al.
7,114,743 B2 * 10/2006 Kassai et al. .................. 280/650
7,179,200 B1 2/2007 Wu
7,246,821 B2 7/2007 Sato
7,367,580 B2 * 5/2008 Iwata et al. ................... 280/642
D572,632 S 7/2008 Willis
7,451,922 B2 11/2008 Daigle et al.
7,540,527 B2 6/2009 Willis et al.
D603,302 S 11/2009 Willis
7,837,208 B2 11/2010 Willis
7,926,834 B2 4/2011 Willis
8,313,116 B2 11/2012 Willis
2003/0047203 A1 3/2003 Lah
2003/0189311 A1 10/2003 Chen et al.
2005/0211285 A1 9/2005 Cowie et al.
2006/0254632 A1 11/2006 Willis
2006/0254633 A1 11/2006 Willis
2007/0018426 A1 1/2007 Willis
2007/0096436 A1 5/2007 Willis
2007/0152416 A1 7/2007 Willis
2008/0041432 A1 2/2008 Willis
2008/0061534 A1 3/2008 Chen
2008/0093826 A1 4/2008 Willis
2008/0111349 A1 5/2008 Willis
2008/0129016 A1 6/2008 Willis
2008/0252043 A1 10/2008 Willis

FOREIGN PATENT DOCUMENTS

| | | | |
|---|---|---|---|
| CN | 1879585 | A | 12/2006 |
| CN | 101053462 | A | 10/2007 |
| MX | PA/a/2005/009620 | | 11/2006 |
| MX | 261611 | | 10/2008 |
| MX | 271402 | | 10/2009 |
| WO | WO 2008/103143 | A1 | 8/2008 |

* cited by examiner

FIG 43
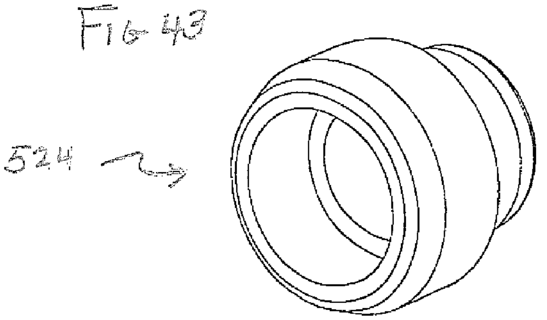
FIG 44
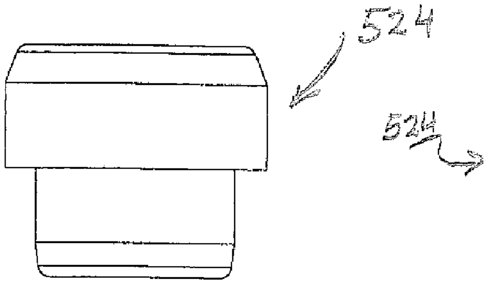
FIG 45
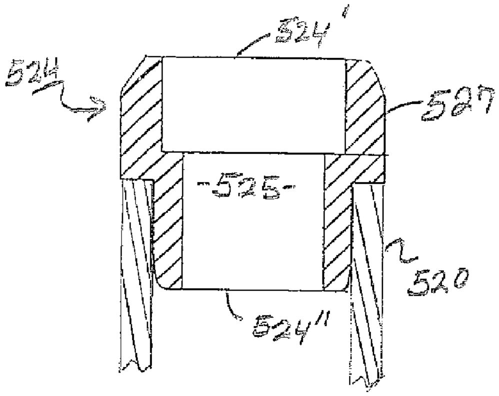
FIG 46
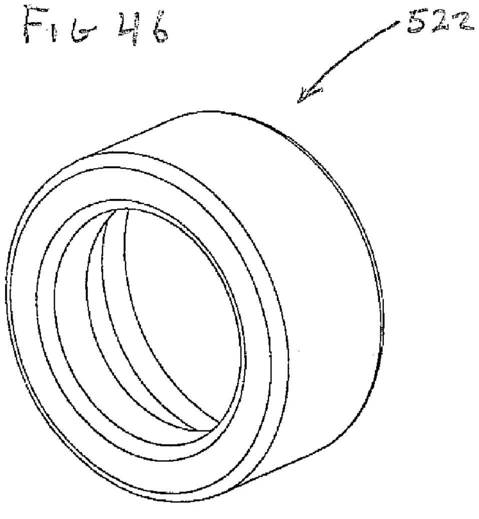
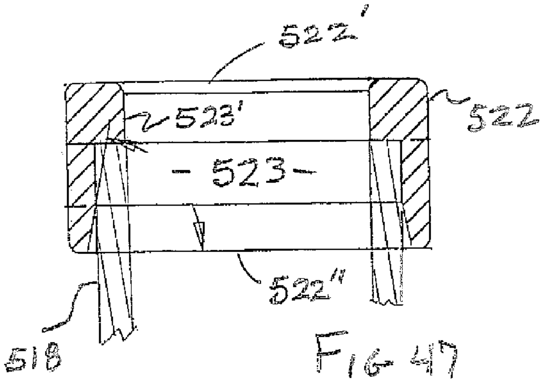
FIG 47

MOBILE SUPPORT ASSEMBLY

CLAIM OF PRIORITY

The present application is a Continuation-In-Part application of application having Ser. No. 12/082,814 which was filed on Apr. 14, 2008, which matures into U.S. Pat. No. 7,837,208 on Nov. 23, 2010, which is a Continuation-In-Part application of previously filed, now abandoned application having Ser. No. 11/981,515 which was filed on Oct. 31, 2007 now abandoned, which is a Continuation-In-Part application of previously filed, now abandoned application having Ser. No. 11/581,762 which was filed on Oct. 16, 2006 now abandoned, which is a Continuation-In-Part application of previously filed application having Ser. No. 11/343,299, which was filed on Jan. 31, 2006, which has matured into U.S. Pat. No. 7,540,527 on Jun. 2, 2009, which is a Continuation-In-Part application of U.S. patent application having Ser. No. 11/129,569 filed May 13, 2005, which has matured into U.S. Pat. No. 7,066,484 on Jun. 27, 2006, which is a Continuation of U.S. patent application having Ser. No. 10/680,596 filed Oct. 7, 2003, which has matured into U.S. Pat. No. 7,073,801 on Jul. 11, 2006, wherein all of the above are incorporated herein in their entirety by reference.

BACKGROUND OF THE INVENTION

1. Field of the Invention

This invention is directed to a mobile support assembly which in its various embodiments is structured to be used as a walker/wheelchair combination or as a walker with a seat structure. The various preferred embodiments of the mobile support assembly facilitate the selective and relative disposition of the various components thereof into a stored orientation for storage, transport, shipment, etc. when not in use or in an operative orientation for use. Certain of the structural components of the embodiments may be selectively disposed to otherwise vary the dimension and/or configuration when in the stored or operative orientations.

2. Description of the Related Art

Numerous individuals suffer from a lack of mobility because of age, medical conditions or the like. As a result, such individuals frequently require some type of mechanical aid or device in order to facilitate their ability to move from one location to the next. Known devices which are readily available on the commercial market include "walker" assemblies which typically allow an individual to support oneself in an upright, substantially stable orientation while standing or walking. For the less infirmed, known walker assemblies allow the individual to safely traverse over both interior and exterior support surfaces, such as floors, sidewalks, streets, etc. Also, conventionally structured walkers may or may not include supporting wheel assemblies. When such wheel assemblies are present they may facilitate the mobility of a user. However, the presence of such wheel assemblies, depending on their structural features and also on whether or not there is safety measures associated therewith, may lessen the stability of the walker. This is especially true when all four legs of the walker frame include a wheel, roller or like structure attached to the lower end thereof.

The advantage of known walker assemblies, over other mobility aids, include a smaller frame of generally lightweight construction which may be more easily stored or transport than other devices when not in use. In order to further facilitate the storage or transport thereof, some known or conventional walkers are foldable, allowing them to be easily disposed within the trunk or other convenient or appropriate area of the vehicle. However, the collapsibility of conventional walkers may be limited in that the walker still must offer sufficient structural integrity as well as provide adequate stability and support to an individual when in use.

Yet another category of devices used to facilitate the mobility of individuals that may have more significant physical limitations include mobile chair structures or "wheelchairs". An increased use of the wheelchair has occurred in recent years, due at least in part, to an increasingly aging population. As such, the development of the wheelchair, in various forms, has progressed from the smaller, less bulky wheelchair structures of somewhat lightweight construction to the heavier, larger chair assemblies. In addition, more sophisticated wheelchair designs are motorized and while more expensive, they are still relatively common. Clearly, the larger more complex and/or motorized wheelchair assemblies have distinct advantages in terms of facilitating mobility without requiring significant manual exertion by the user. In addition, control assemblies associated with the steering and operation of the more sophisticated motorized wheelchair structures are capable of allowing the substantially independent use thereof by individuals who are significantly disabled and are almost totally paralyzed.

Despite the advantages of the type set forth above, the larger more sophisticated wheelchair structures do have certain disadvantages relating to the storage and transport thereof when not in use. In order to overcome such disadvantages collapsible wheelchairs have been developed which are easier to handle, transport and store when not in use. However, many collapsible wheelchair structures still assume a bulky configuration even when in a folded orientation, thereby requiring a significant amount of space when stored or loaded into the trunk or other appropriate location of a vehicle. Moreover, even when intentionally disposed in a collapsed or folded orientation, one or more dimensions of the wheelchair, such as the longitudinal or transverse dimension, is oftentimes not sufficiently reduced to significantly facilitate the storage or transport thereof.

Mobile support structures including both walkers and wheelchairs have independently developed to a point where their use is more efficient and reliable. However, there appears to be an absence of a combined structure having multi-use capabilities such that a single mobile support assembly may be utilized as both a walker and a wheelchair by assuming different orientations of the structural components of which such an assembly is comprised. Accordingly, despite the developments and advancements in mobility aiding devices of the type set forth above, there is still a need for an improved mobile support assembly which provides significant support and stability, whether used as a walker and/or a wheelchair. A proposed mobility aid structured to satisfy such need should be capable of being easily and quickly configured into an operative position for use and possibly into a collapsed position for storage. Further, a proposed multi-use mobile support assembly should have its various structural components cooperatively configured, disposed and structured such that selective positioning thereof into a plurality of different orientations is easily accomplished. As such, the mobile support assembly may be converted for use as a walker or a wheelchair assembly. In addition, such a proposed multi-use mobile support assembly could also have additional, supplementary features such that when the support assembly is in a walker configuration it is also structured to allow at least temporary support of a user in a seated orientation, wherein the user may require temporary, short term rest periods while not requiring the use of a wheelchair, per se.

If developed, such a proposed, multi-use mobile support assembly should comprise a frame, as well as other operative components which are cooperatively structured and relatively operable to allow selective use of the support assembly as either a walker or a wheelchair assembly.

SUMMARY OF THE INVENTION

In at least one of a plurality of preferred embodiments a foldable walker provides an apparatus for assisting a user with mobility. The foldable walker comprises a frame selectively positionable between an operative orientation and a stored orientation. The frame of the walker assembly is at least partially defined by a front leg assembly, including at least a first front leg, and rear leg assembly, including at least a first rear leg connected to the first front leg. The first rear leg includes an upper member having a first end and a second end and a lower member having a first end and a second end. The first end of the upper member is pivotally connected the first end of the lower member, and the lower member is preferably pivotal between an extended use position and a folded storage position.

Another preferred embodiment comprises a foldable walker including the front leg assembly having a first front leg, a second front leg, and a first cross-member. Each of the first and second front legs includes a first end and a second end, and the first cross-member connects the first and second front legs. Similarly, the rear leg assembly comprises a first rear leg and a second rear leg. The first rear leg is connected to the first front leg, and the first rear leg includes an upper member having a first end and a second end, and a lower member having a first end and a second end, and a hinge connecting the first end of the upper member to the first end of the lower member. The second rear leg is connected to the second front leg, and the second rear leg includes an upper member having a first end and a second end, a lower member has a first end and a second end, and a hinge connecting the first end of the upper member to the first end of the lower member. The lower members of the first and second rear legs are preferably pivotal between an extended use position and a folded storage position.

In addition, yet another preferred embodiment of the present invention comprises the walker assembly including a front wheel assembly connected to the front leg assembly and a rear wheel assembly connected to the rear leg assembly. Additional structural features associated with the front and rear wheel assemblies are their ability to be selectively disposed in a position which reduces at least the longitudinal dimension and overall configuration of the walker assembly when in a stored orientation. More specifically, the various embodiments of a walker assembly of the present invention include the front wheel assembly being removably secured to the front leg assembly. Similarly, the rear wheel assembly can be connected to at least a portion of the rear wheel assembly such that it is movable therewith into and out of a folded storage position. Alternatively, the rear wheel assembly may be disconnected from the rear leg assembly. In either structural variation the configuration and at least the longitudinal dimension of the frame of the walker assembly is further reduced in order to facilitate storage and transport of the walker assembly.

When in the stored orientation, the frame of the walker assembly is disposed so as to substantially align the front and rear leg assemblies in adjacent relation to one another along the length of the frame. As such the transverse dimension and overall configuration of the walker assembly is substantially reduced thereby further facilitating the storage and transport of the walker assembly.

Yet additional structural features include a handle assembly which may be adjustably and/or removably secured to the frame of one or more embodiments of the walker assembly. Moreover, a seat is movably connected to the frame and may be associated with a storage compartment. As such, the seat may be selectively disposed in a position such that it supports the user of the walker assembly. When in such a supporting position, the seat overlies and at least partially covers an access opening of a storage compartment. Other associated structural features may include a backrest disposed and structured to support the back of a user when supported in a seated position on the seat of the walker assembly. The structural features of the seat, storage compartment and backrest are such as to further facilitate the compact reduction in configuration and dimension of the walker assembly when disposed in the aforementioned stored orientation so as to facilitate storage and/or transport of the walker assembly, as desired.

Yet another preferred embodiment of the present invention comprises a mobile support assembly which is structured to have multi-use capabilities and which is also capable of being selectively disposed between operative and stored orientations, as with the above described embodiments. More specifically, the mobile support assembly of this preferred embodiment is capable of being selectively used as either a walker or a wheelchair dependent on the orientation of the frame and/or one or more components associated with the frame. Moreover, the frame comprises at least one adjustable portion or adjustable frame segment which is partially rotatable or pivotal relative to a remainder of the frame. Therefore, the frame generally and the adjustable portion or adjustable frame segment specifically can be selectively disposed in either a first orientation or a second orientation. The disposition of the frame and/or adjustable frame segment in the first orientation enables the use of the mobile support assembly as a walker, wherein the disposition of the frame and/or adjustable portion or frame segment in the second orientation enables the use of the mobile support assembly as a wheelchair.

Additional structural and operative features of this preferred embodiment of the mobile support assembly comprise the frame also including two side frame segments which are at least partially configured, structured and disposed to define a portion of a chair assembly. The chair assembly comprises the main support for an individual disposed in a seated orientation, when the mobile support assembly is in the second orientation and is used as a wheelchair. Further, the chair assembly comprises a seat and a back support which are disposed and structured to provide the proper support and at least a certain degree of comfort to a seated individual. The mobility of the support assembly of this preferred embodiment present is facilitated by the frame including a front leg assembly and a rear leg assembly each of which is connected to a wheel assembly. The wheel assembly comprises a plurality of wheels equal in number to the number of legs which comprise the front and rear wheel assemblies. Therefore, the wheel assembly movably supports the mobile support assembly, when utilized as either a walker or a wheelchair, over any of a variety of different ground or other support surfaces.

The frame also includes a handle assembly which along with the rear leg assembly at least partially defines a trailing portion of the frame. For purposes of clarity, the front leg assembly is considered to define a leading portion of the frame, wherein the terms "leading" and "trailing" are used with reference to the normal, forward direction of the mobile support assembly, when used as either a walker or wheelchair.

In addition, the rear leg and the handle assembly are cooperatively disposed and configured to facilitate an individual being disposed adjacent the trailing portion of the frame in an orientation which facilitates the application of a pushing, pulling or other propelling force to the mobile support assembly, whether it is used as a walker or a wheelchair.

Other structural and operative features of the mobile support assembly, especially when in the aforementioned first orientation, is the disposition of the adjustable portion or frame segment in substantially overlying relation to a seat of the chair assembly such that access to the chair assembly is restricted. Such overlying relation of the adjustable frame segment may be more specifically described as the adjustable frame segment being disposed above and in spaced relation to the seat and angularly oriented inwardly from the handle assembly towards a leading portion of the frame and away from the trailing portion of the mobile support assembly.

Positioning of the adjustable frame segment in this first orientation also serves to open or make readily accessible a space between the two handles of the aforementioned handle assembly. Moreover, the back support of the chair assembly is pivotal or otherwise movable so as to be disposed in overlying, confronting engagement with the seat of the chair assembly. As such, the back support may be used as a rest area or support enabling an individual to sit thereon when the mobile support assembly is in the first orientation and utilized as a walker. Therefore, the open spacing between the handles of the handle assembly and the inwardly, angular orientation of the adjustable frame segment further facilitates orientation of an individual in a seated position facing to the rear upon the normal forward direction of travel of the mobile support assembly when used as either a walker or a wheelchair.

The structural and functional versatility of the frame, specifically including the adjustable portion or frame segment is further demonstrated by its selective disposition in the second orientation. When so positioned, the adjustable frame segment is substantially aligned with the handle assembly so as to at least partially define the trailing portion of the mobile support assembly. When in the second orientation, the adjustable support segment further serves to at least partially support or at least assume an aligned relation with the back support of the chair assembly. As should be apparent, when the adjustable portion or frame segment is in the second orientation, for use of the mobile support assembly as a wheelchair, the back support is disposed in an upright orientation connected to, supported by or otherwise cooperatively aligned with the adjustable frame segment, such that access to the chair assembly is facilitated.

The mobile support assembly of this preferred embodiment of the present invention may have similar structural and operative features as the previously described preferred embodiments. More specifically, added versatility of the mobile support assembly is enhanced by the aforementioned handle assembly being adjustably and removably connected to a remainder of the frame. As such, the height of the handle assembly may be selectively adjusted to accommodate different individuals or it may be removed to facilitate storage, regardless of the mobile support assembly being used as a walker or wheelchair. Also, hand operated brakes may be mounted on or connected to the handle assembly so as to be readily accessible from the hand grips or handlebar of each of the handles. Operative interconnection between the hand applied brake members and the wheel assembly is accomplished by appropriate mechanical linkage, such as a cable or the like.

Yet another preferred embodiment of the present invention comprises a mobile support assembly primarily in the form of a walker assembly which, as with previously described embodiments, includes a frame structured to facilitate stable travel of an individual over a variety of different surfaces. In addition, the frame includes a front leg assembly and a rear leg assembly each preferably including two spaced apart legs. The front and rear leg assemblies are moveably interconnected to one another such that the frame may be selectively disposed into either an operative orientation or a stored orientation. When in the operative orientation, the front and rear leg assemblies are positioned to facilitate stable support and/or travel of an individual on and over a variety of different surfaces.

When in the stored orientation, the front and rear leg assemblies are folded or otherwise relatively disposed so as to be at least partially aligned or coextensive. Therefore the stored orientation allows the frame to assume at least a reduced transverse dimension. Moreover, the stored orientation may also facilitate the frame assuming a reduced longitudinal dimension by a selected adjustment of the one or more wheel assemblies relative to the leg assemblies to which they are connected. In addition, the stored orientation of the frame may also be at least partially defined by an at least partial detachment of one or more of the wheel assemblies from their corresponding leg assemblies to further accomplish a reduced longitudinal dimension of the frame.

One feature of this preferred embodiment of the mobile support assembly, being in the form of a walker, comprises the ability to efficiently vary the height of the frame so as to accommodate the users of various sizes. Further, the adjustment or varying of the height of the frame accommodates users when the mobile support assembly is used as a walker and/or when a seat portion associated with the walker is occupied by the user. Effective height adjustment of the frame is more specifically accomplished by an adjustable connection of the wheel assemblies to preferably both the front and rear leg assemblies of the frame.

More specifically, both the front and rear wheel assemblies may be adjusted to extend axially outward from the respective and correspondingly front and rear leg assemblies as they are adjustably connected to the lower portions thereof. Therefore, when the frame is in an operative position and positioned on any of a number of supporting surfaces, the height thereof may be adjusted by varying the outer extension of the front and rear wheel assemblies relative to corresponding ones of the front and rear leg assemblies. The adjustable connection between the wheel assemblies and corresponding ones of the leg assemblies is such as to facilitate the selective positioning of the wheel assemblies in a quick and easy manner to accommodate individual users of different heights, as set forth in greater detail hereinafter.

Additional features of this preferred embodiment of the mobile support assembly, is the provision of at least one, but more practically two bracket assemblies each extending in interconnecting, movable relation between the front and rear leg assemblies. Moreover, each of the one or more bracket assemblies comprise at least two bracket segments pivotally or otherwise movable relative to one another into and out of a folded position. Therefore, the front and rear leg assemblies may be disposed in either of the aforementioned operative or stored orientations.

Further, a lock assembly is associated with at least one of the bracket assemblies and is structured to removably retain or "lock" the corresponding bracket segments into the folded position. As such, the front and rear leg assemblies are prevented from inadvertently being released from the stored orientation until the lock assembly is purposely released.

Manipulated of the lock assembly will permit a separation of the bracket segments from their folded position into their interconnecting, somewhat linearly configured orientation, wherein the frame is in the aforementioned operative orientation.

Additional structural modifications of this preferred embodiment, which may be used with additional embodiments of the present invention as described herein relate to a retaining connector or bracket. More specifically, a modified retaining connector comprises a central connecting pin disposed inwardly from two curved arms and connected thereto. Further, the curved arms are pivotally or hingedly connected to one another so as to substantially open the interior of the retaining connector thereby facilitating connection or disconnection from a leg of the frame. In addition, the curved arms have a collective longitudinal dimension sufficient to facilitate interlocking but removable connection of the free ends thereof. As such, the pivotally connected curved arms may surround the leg portion on which the retaining connector is mounted while substantially enclosing connecting pin on the interior thereof.

In use, the connecting pin and pivotally connected arms of the retaining connector are disposed to retain and removably secure the front and rear wheel assemblies into the lower portions of the legs of the respective front and rear leg assemblies. In such a retaining position, inadvertent removal of the retaining connectors are prevented, thereby assuring that the interconnection between the wheel assemblies and the corresponding leg assemblies, as well as the intended or preferred height of the frame relative to the supporting surface, will be maintained.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which:

FIG. 43 is a perspective view of one component of a stabilizing assembly associated with the preferred embodiment of FIGS. 41 and 42.

FIG. 44 is a side view of the embodiment of FIG. 43.

FIG. 45 is a sectional view of the embodiment of FIGS. 43 and 44 in an at least partially assembled form.

FIG. 46 is a perspective view of another component of the stabilizing assembly.

FIG. 47 is a sectional view in partial cutaway of the embodiment of FIG. 46 in an at least partially assembled form.

Like reference numerals refer to like parts throughout the several views of the drawings.

DETAILED DESCRIPTION OF THE PREFERRED EMBODIMENT

Figure 1:
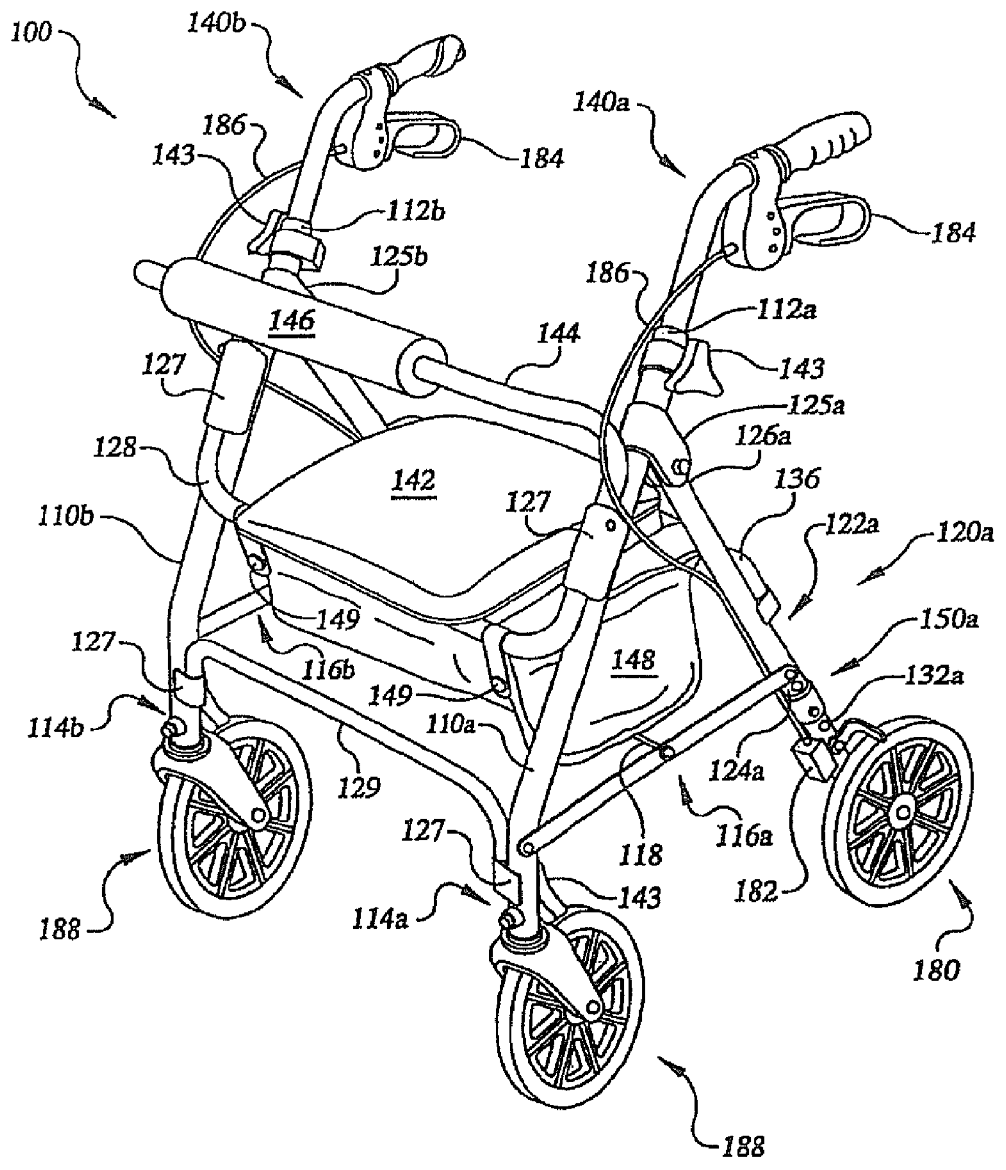
FIG. 1 is a front perspective view of an embodiment, among others, of a foldable walker in an operative position.
Figure 2:
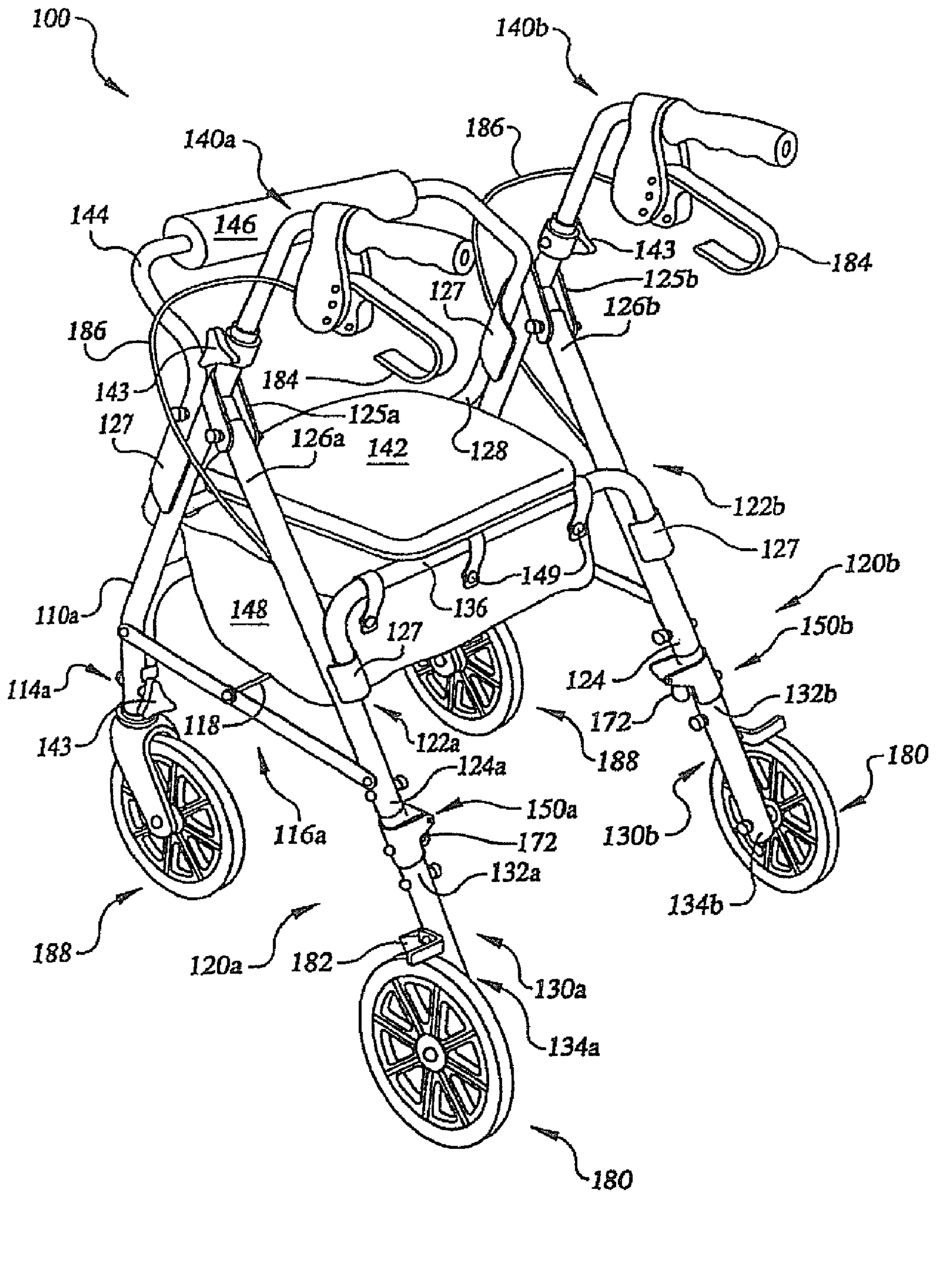
FIG. 2 is a rear perspective view of the foldable walker as shown in FIG. 1.
Figure 3:
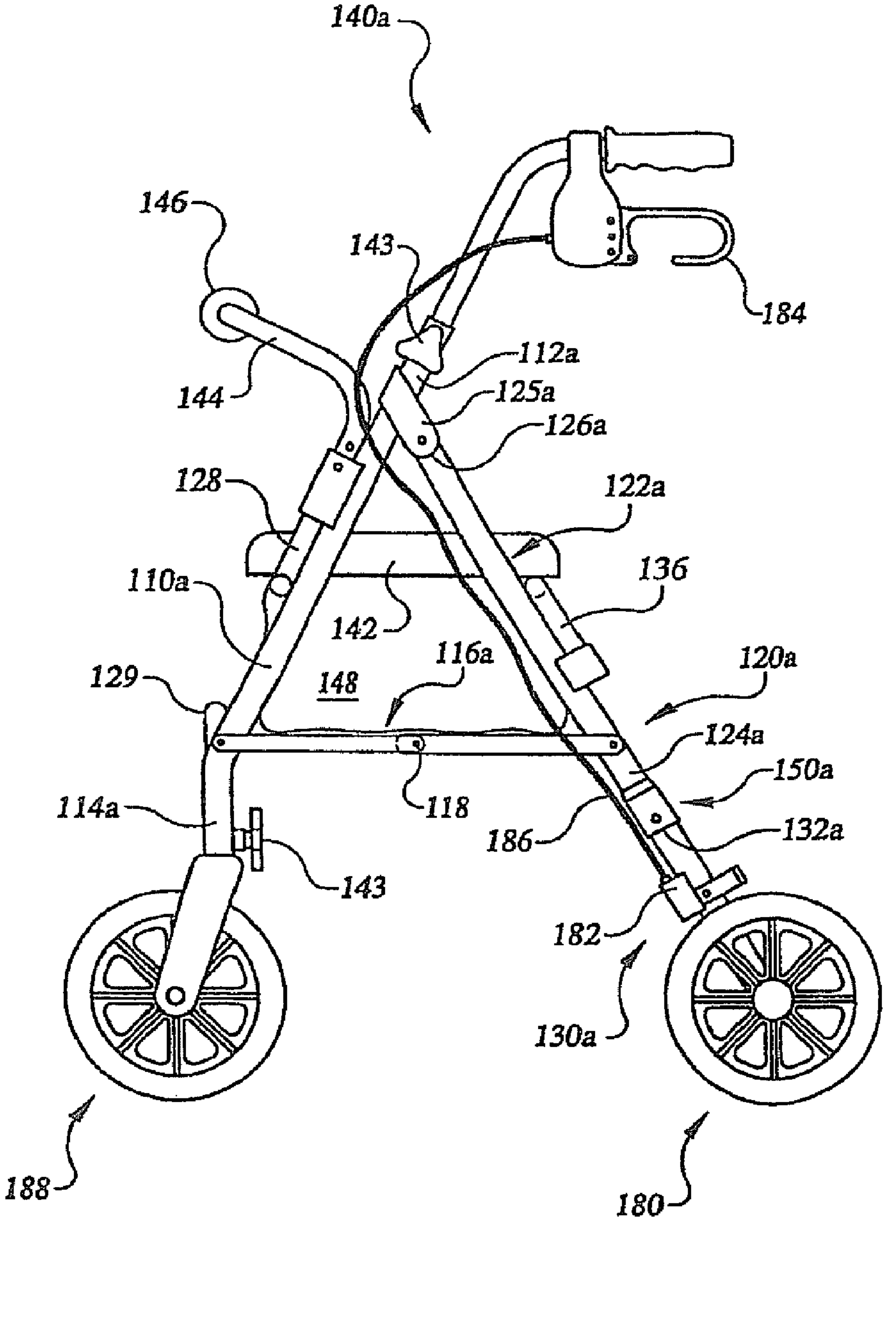
FIG. 3 is a side view of the foldable walker shown in FIG. 1.

Referring now in more detail to the drawings, FIGS. 1-3 illustrate an embodiment of a foldable walker 100 in an operative orientation. As shown, the foldable walker 100 comprises a frame at least partially defined by a front leg assembly and a rear leg assembly. More specifically, the front leg assembly comprises a first front leg 110*a* and a second front leg 110*b* secured to each other by at least a first cross member 128. The first front leg 110*a* and a second front leg 110*b* are each pivotally connected to the rear leg assembly, which comprises a first rear leg 120*a* and a second rear leg 120*b*, respectively. The first and second rear legs 120*a*, 120*b* each include an upper member or portion 122*a*, 122*b*, which in at least one preferred embodiment, are hingedly attached to a respective lower member or portion 130*a*, 130*b* by hinge assemblies 150*a*, 150*b*, respectively, as is discussed in greater detail hereinafter. Preferably, the first upper member 122*a* and a second upper member 122*b* are connected by a second cross member 136 which is positioned so as to be the same height above a support surface beneath the foldable walker 100 as the first cross member 128. Additional cross members, such as cross member 129, may (though not necessarily in all embodiments) be provided between the first and second front legs 110*a*, 110*b* and the first and second upper members 122*a*, 122*b* to provide additional stability to the foldable walker 100. Preferably, the first cross member 128, the second cross member 136, and cross member 129 are welded to brackets 127 which are in turn welded to their respective legs of the foldable walker 100. Of course, other connection structures are also considered to be within the scope of the present invention. Further, the first and second front legs 110*a*, 110*b* are preferably connected to the first and second upper members 122*a*, 122*b*, respectively, by folding brackets 116*a* and 116*b*. The first and second folding brackets 116*a*, 116*b* are preferably connected to each other with a tie rod 118 and are configured such that the folding brackets 116*a*, 116*b* only collapse when the tie rod 118 is pushed upwardly away from the support surface beneath the foldable walker 100.

Figure 4A:
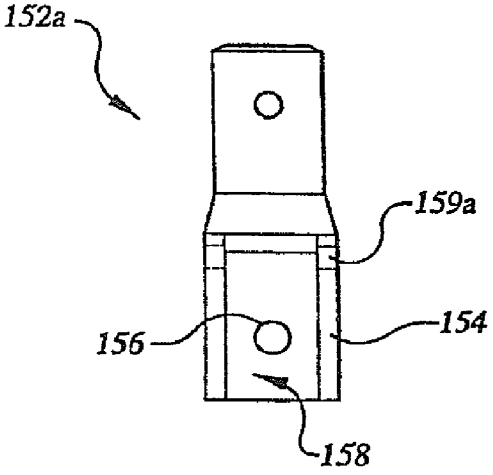
FIGS. 4*a* and 4*b* are front and side views of an upper portion of an embodiment of a hinge assembly as used on the foldable walker shown in FIG. 1.
Figure 4B:
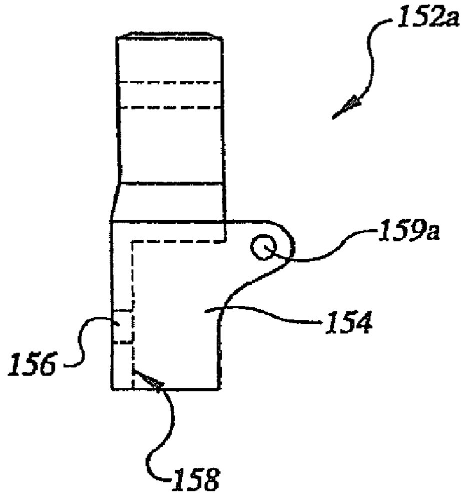
Figure 5A:
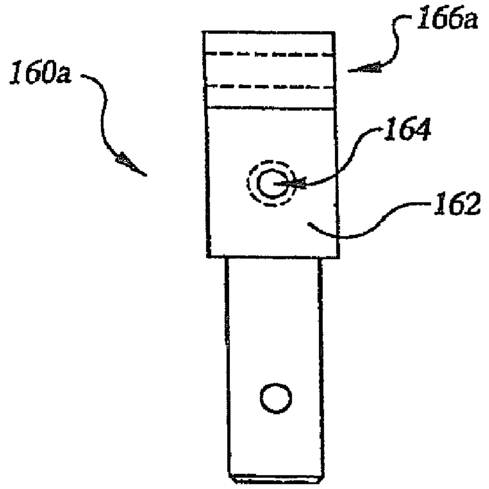
FIGS. 5*a* and 5*b* are front and side views of a lower portion of an embodiment of a hinge assembly as used on the foldable walker shown in FIG. 1.
Figure 5B:
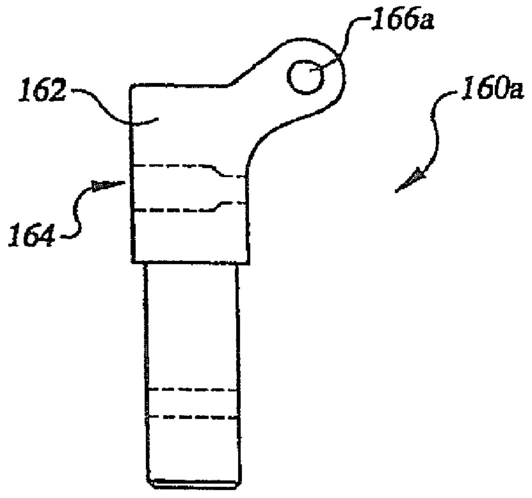

A previously noted, and as best shown in FIG. 2, the first and second upper members or portions 122*a*, 122*b* are hingably connected to the first and second lower members or portions 130*a*, 130*b* by first and second hinge assemblies 150*a*, 150*b*, respectively. For purposes of clarity, only the first rear leg 120*a* will be described, it being understood that the second rear leg 120*b* has equivalent structural and operative features. As shown, the second end 126*a* of the first upper member 122*a* is preferably rotatably connected through a pivot structure, such as a pivot assembly 125*a*, to the front leg 110*a*. Similarly, pivot assembly 125*b* rotatably connects the second end 126*b* to the second front leg 110*b*. The upper portion 152*a* (FIGS. 4*a* and 4*b*) of the first hinge assembly 150*a* is secured to the first end 124*a* of the upper member 122*a*. Similarly, the lower portion 160*a* (FIGS. 5*a* and 5*b*) is mounted to the first end 132*a* of the first lower member 130*a*. By passing an axle 166 through corresponding axle apertures 159*a* in the upper portion 152*a* and a corresponding axle channel 166*a* in the lower portion 160*a*, the upper and lower portions 152*a*, 160*a* are hingably secured to each other. As such, the first lower member 130*a* is secured to the first member 122*a*, as shown in FIGS. 1-3. As shown in FIGS. 6*a*-6*d*, the lower portion 160*a* includes a biased locking pin 170 that is threadably secured to a low profile button 172 to facilitate operating the first hinge assembly 150*a*. As well, the locking pin 170 is biased by a spring 174. Operation of the first and second hinge assembly's 150*a*, 150*b* and the foldable walker 100 are discussed in greater detail hereinafter.

Again referring to FIGS. 1-3, preferred embodiments of the foldable walker 100, when in the operative orientation as shown, may include a seat 142 movably connected to and supported by the first and second cross members 128, 136. As represented, the seat assembly 142 is in a supporting position or allowing a user to be seated thereon. A backrest 144 supported between the first and second front legs 110*a*, 110*b* may also be disposed in supporting relation to the back of a seated user and therefore may include a cushion or pad 146 for the comfort of the user. Preferably, the seat assembly 142 is configured to rotate about the first cross member 128 such that the seat 142 can be rotated toward the backrest 144 and be disposed in substantially confronting relation thereto, when the frame of the walker assembly is in the stored orientation of FIGS. 7 and 8.

When so disposed, an interior of a storage compartment 148 normally disposed beneath the seat 142 is accessible and exposed. Preferably, the storage compartment 148 is supported by the first and second cross members 128, 136 and is formed of a flexible material secured to the first and second cross members 128, 136 with a plurality of snaps 149 that permit the storage compartment 148 to be removed. In a preferred embodiment the flexibility of the storage compartment 148 is such as to be disposed in an expanded position when the frame is in the operative orientation of FIGS. 1-3 and in a collapsed position, between the front and rear leg assemblies, when the frame is in the stored position of FIG. 8. However, other embodiments are envisioned wherein the storage compartment 148 comprises a wire mesh basket or other like structure.

As represented through out the accompanying Figures, the walker assembly 100 preferably includes a front wheel assembly comprising wheel structures 188 and a rear wheel assembly comprising wheel structures 180. More specifically, first and second front legs 110*a*, 110*b* each include a different one of the front wheel structures 188 disposed at the second end 114*a*, 114*b* of each leg. As shown, front wheel structures 188 are preferably caster-mounted such that they are fully rotatable about the first and second front legs 110*a*, 110*b*, thereby increasing the maneuverability of the foldable walker assembly 100. The first and second rear legs 120*a*, 120*b* are each connected to one of the rear wheel structures 180 which are disposed on the second end 134*a*, 134*b* of the first and second lower members or portions 130*a*, 130*b*. Preferably, the rear wheel assemblies 180 are not caster-mounted and therefore do not pivot about the first and second rear legs 120*a*, 120*b*.

As shown in FIGS. 1-3, at least one preferred embodiment of the foldable walker assembly 100 is configured to assist a user to walk while the first and second lower members or portions 130*a*, 130*b* are locked in their fully extended use position by virtue of the structural features of hinge assemblies 150*a* and 150*b*. For ease of description, only the first hinge assembly 150*a* is discussed, it being understood that the hinge assembly 150*b* is the duplicate and/or structural equivalent thereof. During use, first hinge assembly 150*a* is configured as shown in Figured 6*a*, as viewed from the front of the walker 100. The core 162 of lower portion 160*a* is disposed within sleeve 154 of the upper portion 152*a*. The core 162 is secured in position by a locking pin 170 that extends through both the upper portion 152*a* and a lower portion 160*a*. As shown, when the core 162 is properly seated within the sleeve 154, a locking channel 164 that houses the biased locking pin 170 aligns with a locking aperture 156 formed in the sleeve 154. The locking channel 164 also houses a spring 174, which biases the locking pin 170 such that a portion of the locking pin 170 extends outwardly from the locking channel 164 and engages the locking aperture 156.

Figure 7:
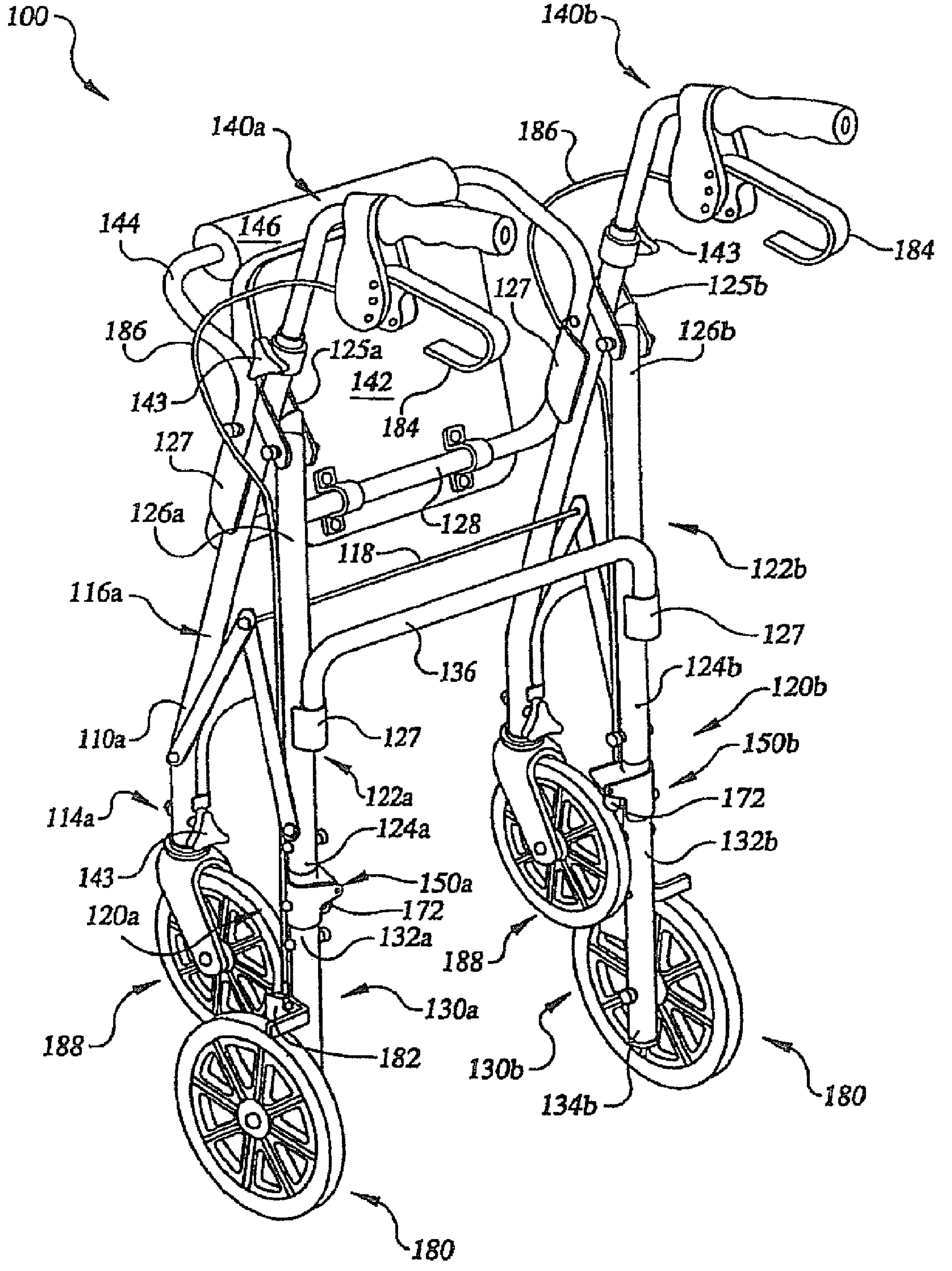
FIG. 7 is a rear perspective view of the foldable walker shown in FIG. 1, when partially folded as it is being disposed into a stored orientation.
Figure 8:
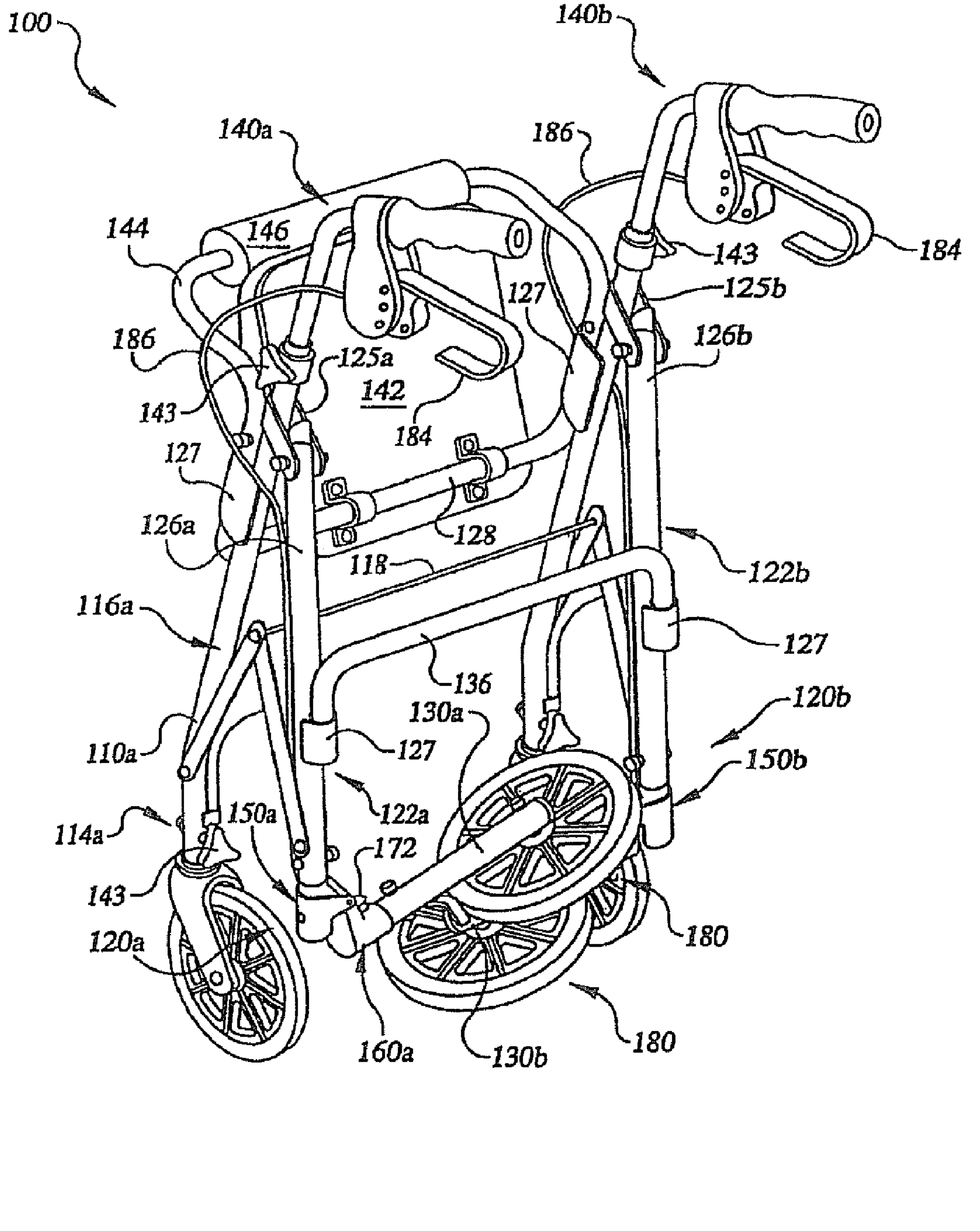
FIG. 8 is a rear perspective view of the foldable walker shown in FIG. 1, when fully folded and in the stored orientation.
Figure 9:
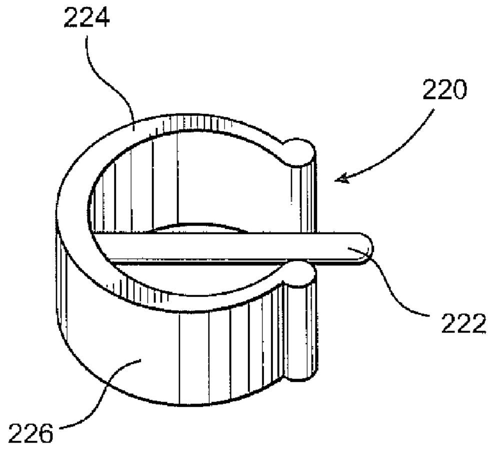
FIG. 9 is a top plan view of a retaining connector used in at least one preferred embodiment of the present invention to retain a wheel assembly in connected relation to a corresponding leg assembly.
Figure 10:
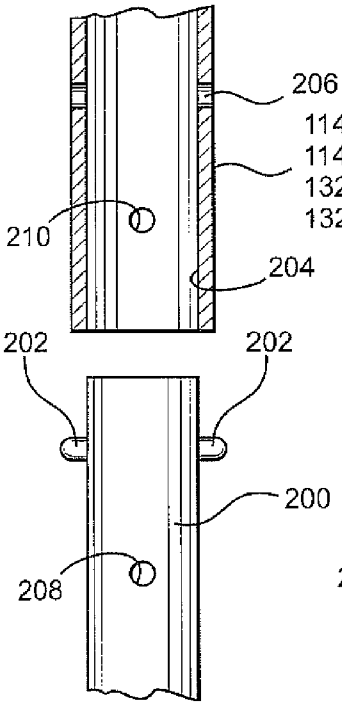
FIG. 10 is a front view in partial cutaway of corresponding connecting portions of the front and/or rear leg assemblies with the front and/or rear wheel assemblies.
Figure 11:
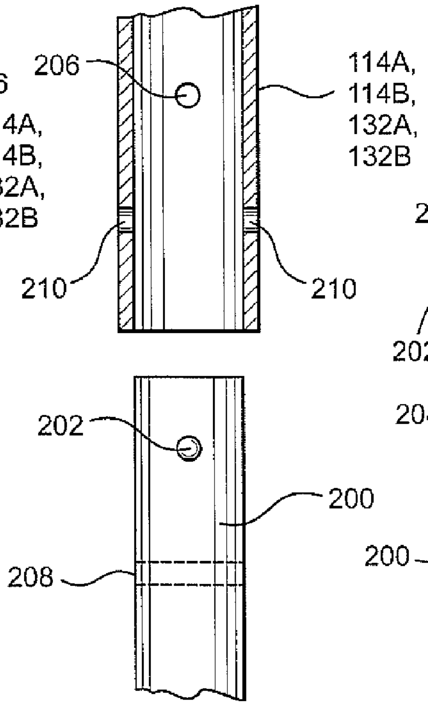
FIG. 11 is a side view in partial cutaway of the embodiment of FIG. 10.
Figure 12:
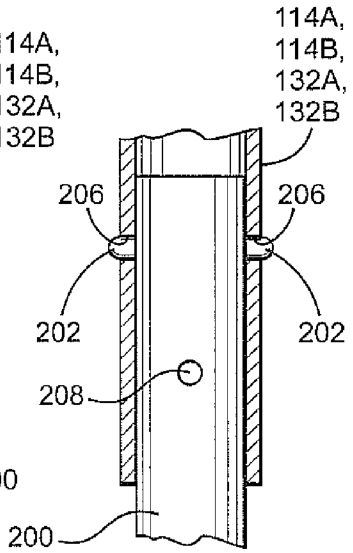
FIG. 12 is a front view in partial cutaway of the embodiments of FIGS. 10 and 11 in a connected or assembled position.

When it is desired to transport or store the walker assembly 100, the transverse dimension of the walker assembly 100 may be reduced by folding it into a compact configuration. Moreover, folding of the walker assembly 100 from the operative orientation of FIGS. 1-3, wherein the front and rear leg assemblies are in a substantially angular orientation relative to one another, into the stored orientation of FIGS. 7 and 8, may be accomplished by the user first pushing upwardly on one of the folding brackets 116*a*, 116*b* or the tie rod 118. As the tie rod 118 moves upwardly the first and second rear legs 120*a*, 120*b* rotate toward the first and second front legs 110*a*, 110*b* about the pivot points adjacent the second ends 126*a*, 126*b* of the first and second upper members 122*a*, 122*b*. The first and second rear legs 120*a*, 120*b* will rotate inwardly until the frame of the walker assembly is configured in the manner shown in FIGS. 7 and 8 wherein the front and rear leg assemblies are substantially aligned or at least partially aligned along the length of the frame. The walker is shown in FIGS. 7 and 8 without the storage compartment 148 in order to more clearly show the folding operation.

Figure 6A:
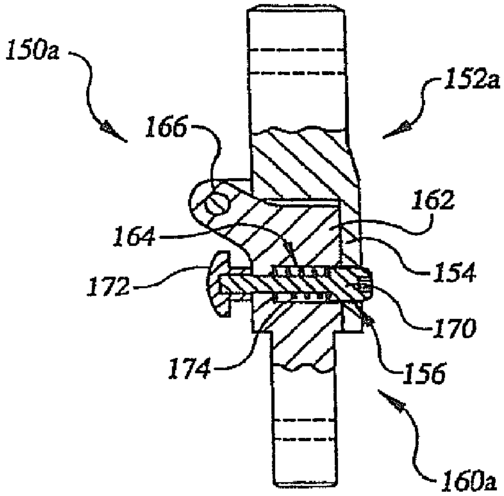
FIGS. 6*a*-6*d* are partial, cut-away side views of an embodiment of a hinge assembly, including upper and lower portions as shown in FIGS. 4*a*-4*b* and 5*a*-5*b*, respectively, as used with the foldable walker shown in FIG. 1.
Figure 6B:
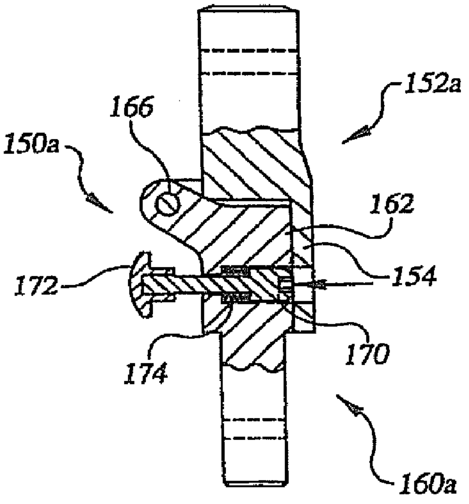
Figure 6C:
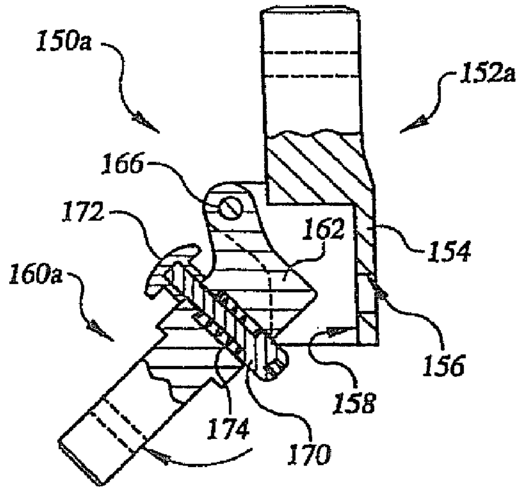

To further reduce the longitudinal dimension of the foldable walker 100, a user can fold the lower members 130*a*, 130*b* of the first and second rear legs 120*a*, 120*b* and their associated rear wheel assemblies 180 inwardly toward one another. In order to fold first lower member 130*a* into storage position, the user first pulls button 172 inwardly toward the center line of the foldable walker 100. In doing so, the user compresses the spring 174 and causes the locking pin 170 to be disengaged from the locking aperture 156 of the upper portion 152*a*, as shown in FIG. 6*b*. After the locking pin 170 is disengaged from the locking aperture 156 the lower portion 160*a* is pivotal about the axis 166 (FIG. 6*c*), thereby allowing lower member 130*a* to be swung into its storage position, as shown in FIG. 8. Similar steps are performed on the second hinge assembly 150*b* so that lower member 130*b* can be swung into its storage position.

Figure 6D:
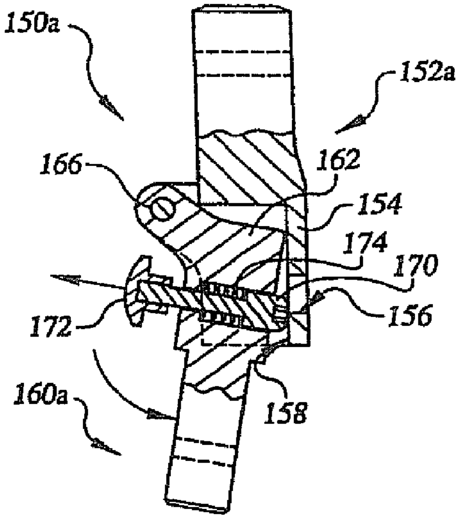

Once a user releases the button 172, the spring 174 causes the locking pin 170 to be urged outwardly from the core 162 into its fully extended position. To lock the wheels in place for use once again, the user may pivot the first lower member 130*a* downwardly from its storage position until the locking pin 170 encounters camming surface 158, as shown in FIG. 6*d*. As lower member 130*a* continues to be rotated into alignment with upper member 122*a*, the locking pin 170 travels along the camming surface 158, subsequently causing the spring 174 to be compressed and the button 172 to be urged away from the lower portion 160*a* of the first hinge assembly 150*a*. Eventually, the locking pin 170 encounters the locking aperture 156 and extends therethrough because of the biasing effect of the spring 174, as shown in FIG. 6*a*. After the lower member 130*b* has been similarly positioned, the first and second front legs 110*a*, 110*b* and the first and second rear legs 120*a*, 120*b* are urged outwardly away from each other thereby causing folding brackets 116*a*, 116*b* to become fully extended. With the lower members 130*a*, 130*b* so positioned, the foldable walker 100 is configured to assist a user in walking.

Preferably, the locking pin 170 is configured such that it is not likely to be inadvertently disengaged from the locking aperture 156. For example, as shown in FIGS. 6*a*-6*d*, the button 172 is shaped such that it is of a low profile and is therefore not prone to being snagged or pulled during use. As well, it is preferable that the button 172 is shielded by a portion of the hinge assembly 150. As best shown in FIG. 6*a*, the button 172 is shielded by the portion of the hinge assembly 150*a* that houses the axle 166. However, the button as shown is merely one embodiment and numerous other shapes are envisioned.

Yet another preferred embodiment of the present invention is represented in FIGS. 9 through 14 and may be substituted, at least in part, for the use of the hinge assemblies 150A and 150B as explained above and as represented in detail in the above-described figures. More specifically, in order to compact the configuration and reduce at least the longitudinal dimension of the frame of the walker assembly 100, and possibly the transverse dimension thereof as well, the front and rear wheel assemblies may be removed from the front and rear leg assemblies. For purposes of clarity, the structure represented in FIGS. 9 through 14 represents a single lower leg portion. However, it is emphasized that in describing this particular structure, each of the front and rear legs, 114A, 114B, 132A, 132B is the duplicate and/or structural equivalent of one another such that the description of one lower leg portion is meant to be descriptive of each of the corresponding leg structures. Further, member 200 defines the outwardly extending shaft to which each of the front and rear wheel structures 188 and 180 are secured.

Figure 13:
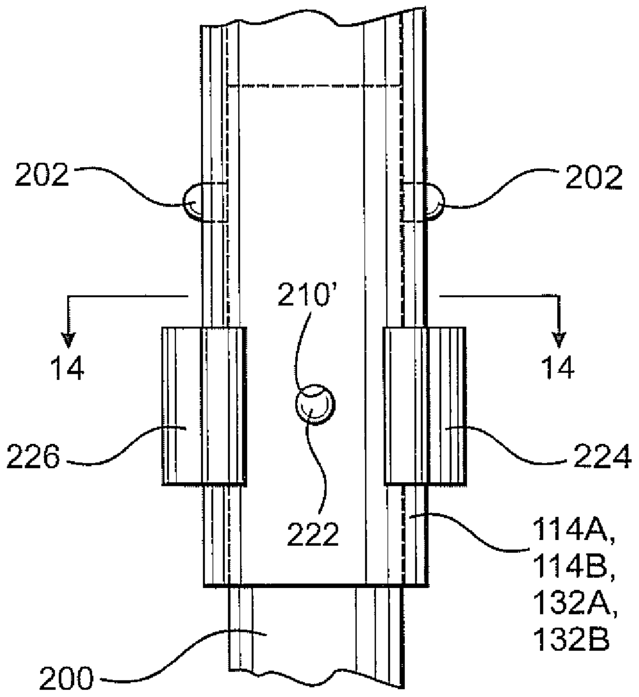
FIG. 13 is a front view in partial cutaway of the embodiment of FIG. 12 with the retaining connector, represented in FIG. 9, disposed in a retaining position relative to the correspondingly connected leg and wheel assemblies.
Figure 14:
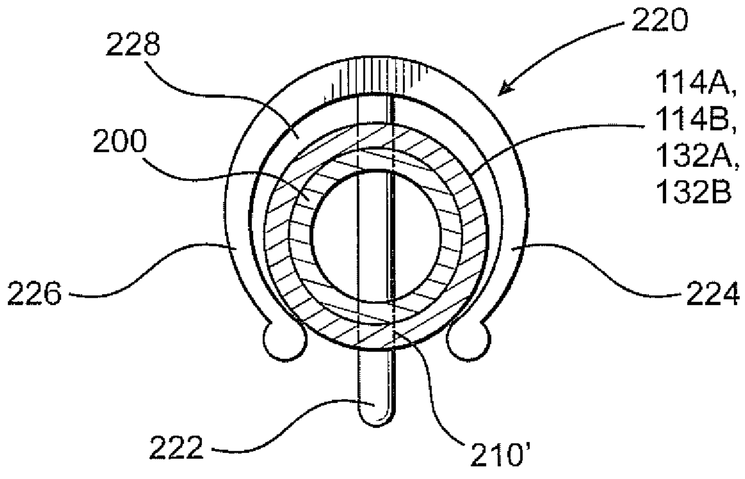
FIG. 14 is a sectional view along line 14-14 of FIG. 13.

Accordingly as clearly shown in FIGS. 10 through 13, the transverse dimension of the shaft 200 is at least minimally less than the interior transverse dimension of the lower portion 114A, etc, of the front and rear leg assemblies. This relative dimensioning allows for the shaft 200 to be inserted within and removed from the interior of the lower portion 114A, etc, as demonstrated by a comparison of the unassembled and assembled structures respectively represented in FIGS. 10-11 and 12. Further, the shaft 200 includes spring bias fingers 202 which are retractable, at least partially, into the interior of the shaft 200 as they pass along the interior surface 204 of the lower portion of the leg 114A, etc. However, upon the spring bias fingers 202 being aligned with coaxial apertures 206, the fingers 202 will expand outwardly thereby removably locking or retaining the shaft 200 within the interior of the leg lower portion 114A, etc. Removal of the shaft 200 from the interior of the leg lower portion 114A, etc. is accomplished by inwardly depressing the fingers 202 such that they are removed from the apertures 206 and are allowed to slide along the interior surface 204. However, once the fingers 202 are aligned with and extend outwardly from the apertures 206, apertures 208 and 210, respectively formed in the shaft 200 and the leg lower portion 114A, etc, will be axially aligned. Such axial alignment between the apertures 208 and 210 will facilitate the connection of a retaining connector or bracket 220 in its intended, retaining position as best shown in FIGS. 13 and 14.

More specifically, the retaining connector or bracket 220 comprises central connecting pin or shaft 222 spaced inwardly from curved arms 224 and 226. The free ends of the each of the arms 224 and 226 are disposed in spaced relation to one another so as to facilitate passage of lower leg portion 114A, etc. there between and into the interior 228 of the retaining connector structure 220 and between the arms 224 and 226. Further, the retaining connector or bracket 220 preferably includes the arms 224 and 226 being formed from a flexible material and as such may expand outwardly to further facilitate passage of the lower leg portion 114A, etc. into the interior 208 of the retaining connector 220. In the connected position shown in FIGS. 13 and 14, the retaining pin 222 therefore passes through axially aligned apertures 208 and 210. Also, the retaining pin 220 is preferably of sufficient length to pass outwardly from the outermost aperture 210' as shown in FIGS. 13 and 14.

Additional structural features include an axially adjustable and removable handle assembly, comprising a first and second handlebar 140*a*, 140*b* adjustably connected to the first end 112*a*, 112*b* of each front leg 110*a*, 110*b*, respectively. Preferably, the first and second handlebars 140*a*, 140*b* are secured to the walker assembly 100 with easily manipulated threaded knobs 143, as are other parts of the walker 100. The first and second handlebars 140*a*, 140*b* are connected to the first and second front legs 110*a*, 110*b* such that they can be axially adjusted based upon the height of the user. Also, each handlebar 140*a*, 140*b* includes a lever 184, which is used to activate a brake 182 that is adjacent the rear wheel assemblies 180. By urging the lever 184 upwardly toward the respective handlebar 140*a*, 140*b*, a cable 186 is pulled which in turn causes the brake 182 to engage the rear wheel assembly 180, thereby preventing the foldable walker 100 from rolling. Further, the levers 184 may be manipulated such that the brakes 182 are activated although the user is no longer exerting force on the lever 184.

Figure 15:
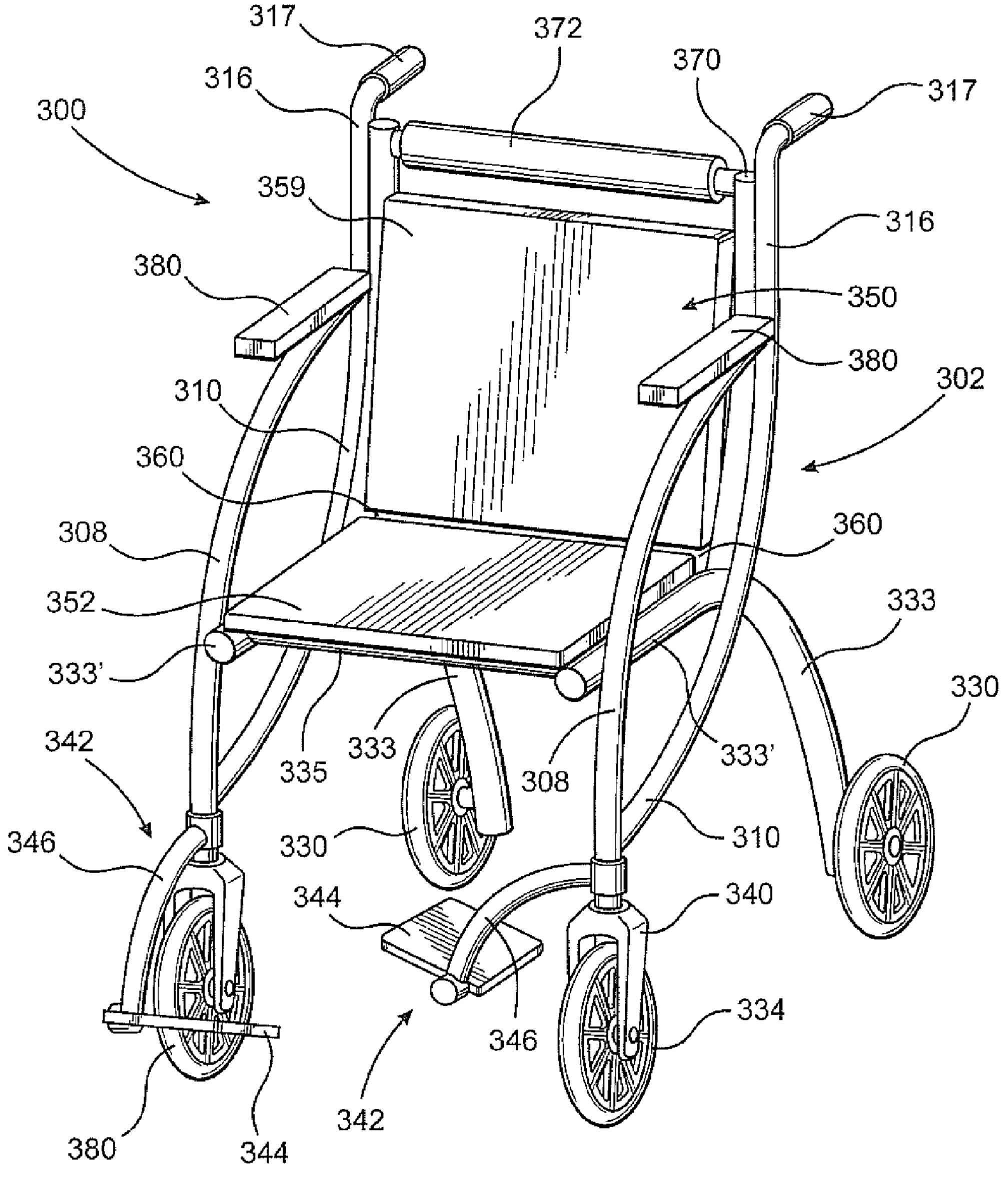
FIG. 15 is a front perspective view of yet another preferred embodiment of the present invention directed to a multi-use mobile support assembly capable of being used as either a walker or a wheelchair.
Figure 16:
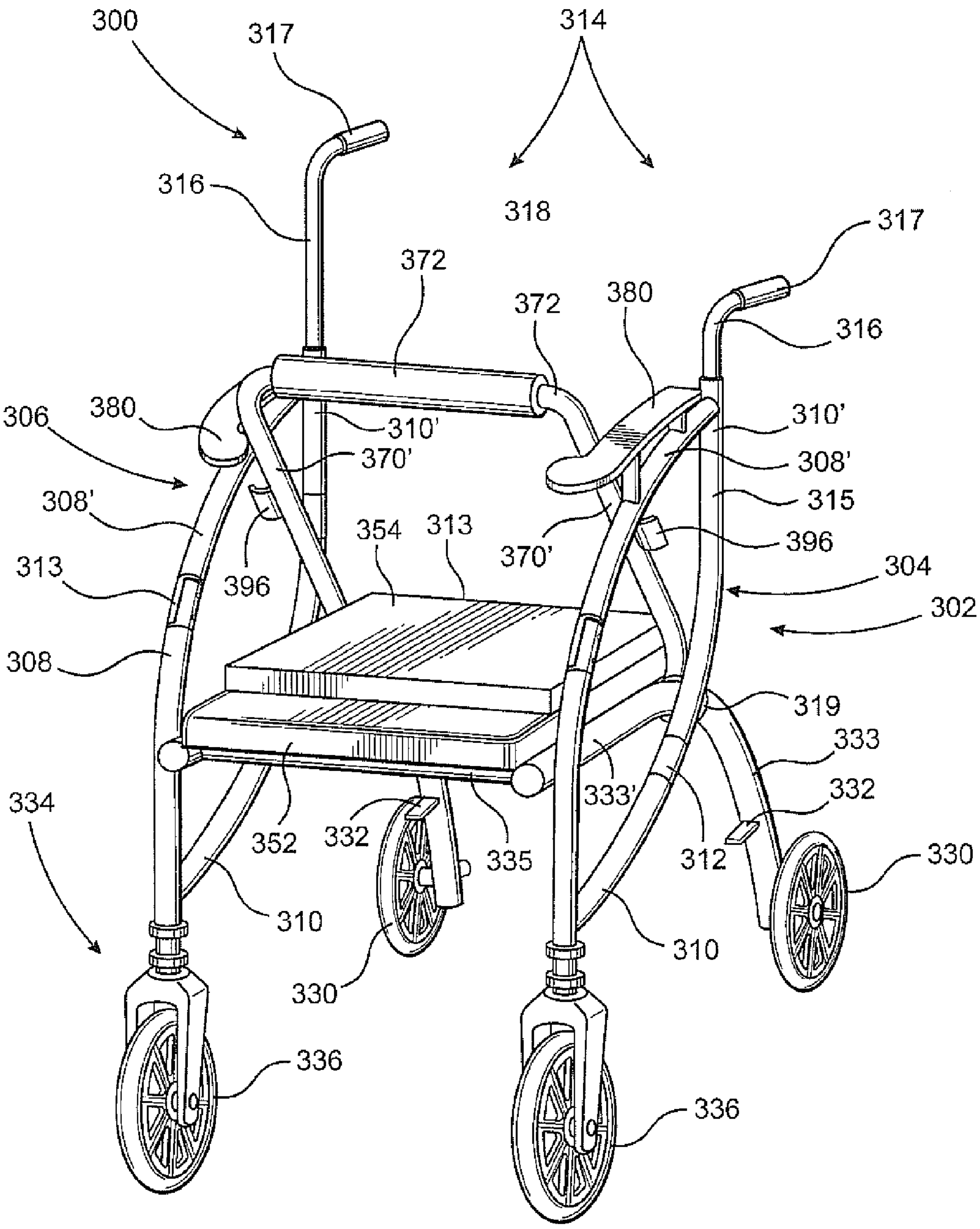
FIG. 16 is a side perspective view of the embodiment of FIG. 1, wherein the mobile support assembly has assumed a first orientation enabling its use as a walker.
Figure 17:
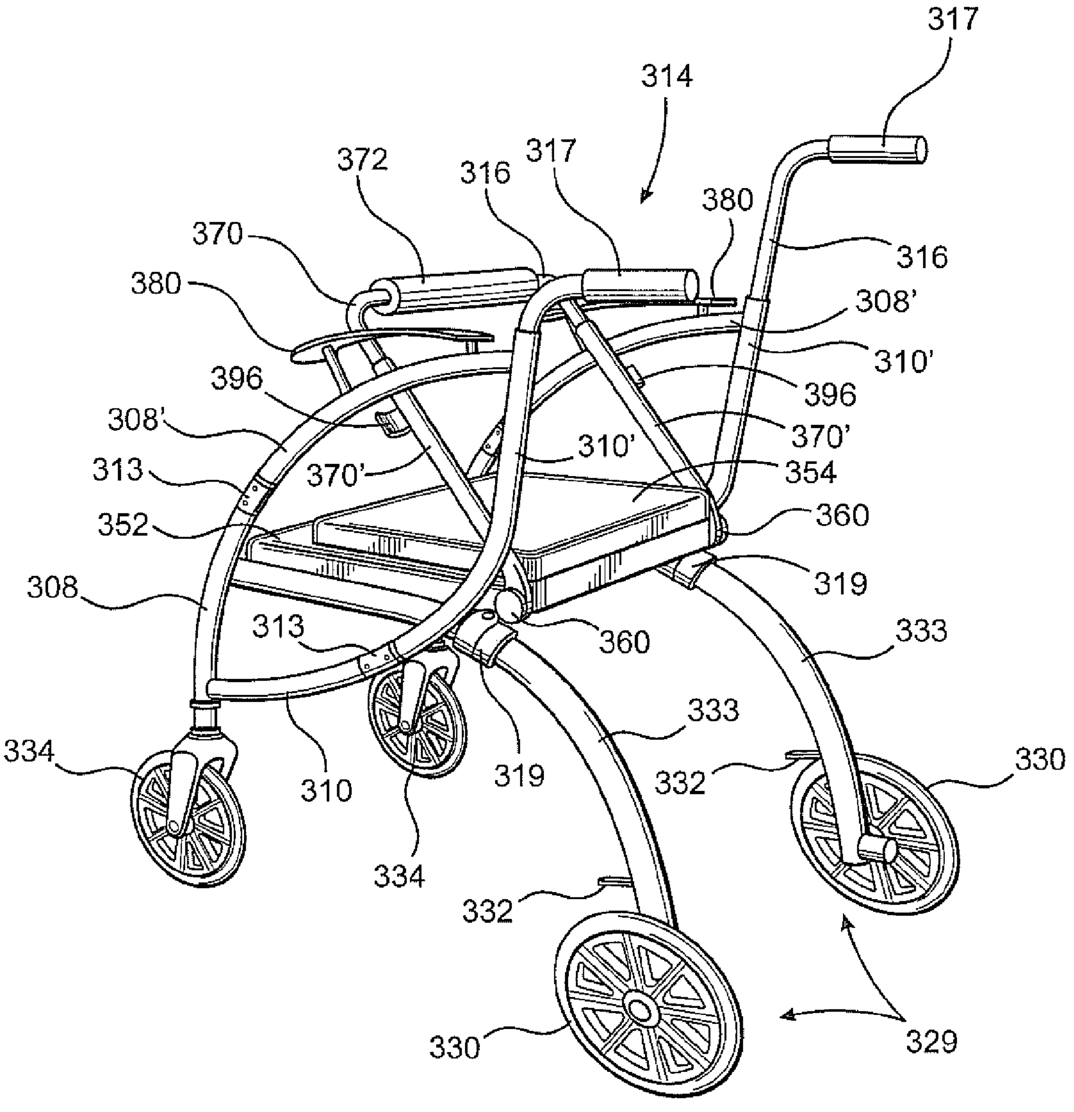
FIG. 17 is a rear perspective view of the embodiment of FIG. 16.

With primary reference to FIGS. 15 through 24, the present invention comprises yet another most preferred embodiment including a mobile support assembly generally indicated as 300. Moreover, the mobile support assembly 300 demonstrates a significant degree of versatility by its selective use as either a walker or a wheelchair, dependent upon the disposition of at least one adjustable portion or adjustable frame segment 370 of the frame generally indicated as 302, as will be described in greater detail hereinafter. For purposes of clarity, FIG. 15 represents the orientation of the adjustable frame segment 370, as well as other structural and operative components of the mobile support assembly 300, so as to facilitate its use as a wheelchair. In contrast, FIGS. 16 and 17 represent the orientation of the frame 302, specifically including the adjustable portion or adjustable frame segment 370, as well as other structural and operative components of the mobile support assembly 300 facilitates its use as a walker.

More specific details include the frame 302 comprising two spaced apart side frame segments 304 and 306 each of which include a substantially oblong or "eye" shaped configuration. This configuration of each of the side frame segments is at least partially defined by an upper side frame segment 308 and a lower side frame segment 310 having an outwardly bowed or curvilinear configuration. As will also be explained in greater detail hereinafter, side frame segments 304 and 306 and more specifically the upper and lower side frame segments 308 and 310 may include connecting structures 312, 313, 315 and 319, which facilitate the disposition or arrangement of the mobile support assembly 300, specifically including portions the frame 302 into a compact, reduced size stored orientation for storage, transport, etc, at least partially similar to the one or more embodiments of FIGS. 1 through 14. The stored orientation will be described in greater detail hereinafter with primary reference to the mobile support assembly 300 as represented in FIGS. 20 through 24.

The mobile support assembly 300 further includes a handle assembly generally indicated as 314 including two handles 316 disposed in spaced relation to one another such that an open spacing 318 may be formed there between so as to facilitate placement of an individual in a proper orientation to propel the mobile support assembly 300 when used as either a wheelchair as demonstrated in FIG. 15 or a walker as demonstrated in FIGS. 16 and 17. As will be more specifically explained and described hereinafter, the spacing 318 is rendered more accessible when the frame 302, or at least one or more structural components thereof is selectively disposed to facilitate use of the mobile support assembly 300 as the walker.

Other features of the handle assembly 314 include each of preferably two handles 316 having a handlebar 317 preferably structured in the form of handgrips. In addition and with reference to the embodiment of FIGS. 1 through 3, the handle assembly 314 may include levers 184 used to activate a one or more brake structures 182 that are operative to exert a braking force on the rear wheel assembly 320. Moreover, the brake structures 182 may be disposed in operative relation to the rear wheels 330 of the embodiment of FIGS. 15 through 17. While this hand activated or operated brake assembly is not represented in the embodiments of FIGS. 15 through 20, it may be readily adapted for connection to or mounting on the mobile support assembly 300 so as to facilitate hand actuation of the braking assembly 182, as described with specific reference to the embodiment of FIGS. 1 through 3. As such, manipulation of the levers 184 upwardly towards the respective handlebars 317 serves to pull a mechanical connecting cable 186 which in turn causes the brake 182 to engage the rear wheel 330 of the rear wheel assembly 329, thereby restricting movement of the mobile support assembly 300. When the hand activated brake assembly or brakes 182 are not utilized on the preferred embodiment of FIGS. 15 through 20, a foot activated brake assembly may be utilized, wherein a foot activated lever 332 is associated with brake structures mounted on or connected to each of the rear wheels 330.

As also clearly depicted in FIGS. 15 though 17 and 20, the mobile support assembly 300 also includes a front wheel assembly 334 comprising front wheels 336 connected to the front legs, which are at least partially defined by a lower end portion of the upper side frame segments 308. For purposes of clarity the frame 302 may also be described as including a trailing portion and a leading portion, wherein the terms "trailing" and "leading" are described with reference to the normal or conventional, forward direction of travel of the mobile support assembly 300, whether used as a walker or a wheelchair. More specifically, the leading portion of the frame 302 is generally and at least partially defined by the location of the front wheel assembly 334, including the front wheels 336. In contrast the trailing portion of the frame 302 is generally and at least partially defined by the location of the handle assembly 314, the rear wheel assembly 329 and/or the rear legs 333.

Figure 18:
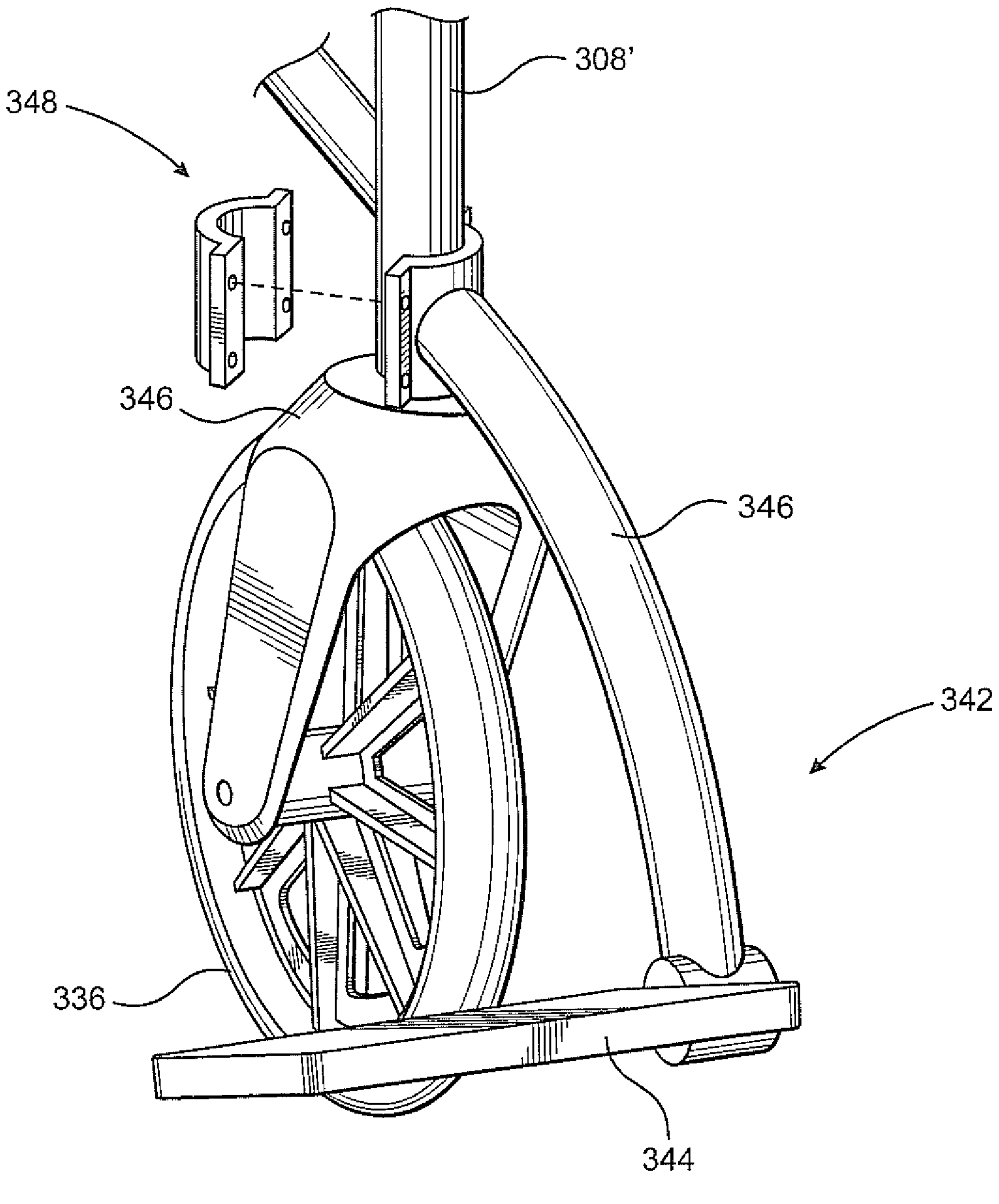
FIG. 18 is a detailed view in partial cutaway of portions of a wheel assembly associated with the mobile support assembly and a foot pedal or support which may be associated therewith.

In order to facilitate the maneuverability of the mobile support assembly 300, each of the front wheels 336 are rotatably connected to the frame 302 and more specifically interconnected to the outer or lower ends of the upper side frame segments 308 by means of a castor like structure shown in detail in FIG. 18. More specifically, a castor base or housing 340 connected to the axis of rotation of each of the wheels 336 allows the wheels to swivel appropriately to assume a desired angular orientation for forward, rearward or other directional traveling of the mobile support assembly 300 as desired. As set forth above, the propelling force applied to the handle assembly 314 may either be a pushing force, a pulling force or a combination of both in order to accomplish desired and selected directional traveling.

With further reference to FIG. 18, at least one preferred embodiment and/or structural modification of the mobile support assembly 300 comprises a foot pedal or like foot support assembly, generally indicated as 342. The foot support assembly 342 includes a pedal portion 344 and a support arm 346. The support arm 346 is rotatably or pivotally connected to the lower end of the upper side frame as at 308 by means of a rotatable connecting assembly or pivotal hinge generally indicated as 348. As such, the leg or foot support assembly 342 may be pivoted into or out of either the operative position represented in FIG. 18 or the folded, collapsed position, at least partially defining a stored orientation of the mobile support assembly as represented in FIG. 15. As set forth above, the stored orientation of the mobile support assembly will be described in greater detail hereinafter.

As set forth above, the versatility of the mobile support assembly 300 is facilitated by its selective use as either a walker, as represented in FIGS. 16 and 17, or as a wheelchair, as represented in FIG. 15. Accordingly, and with primary reference to FIG. 15, the mobile support assembly 300 includes a chair assembly generally indicated as 350 comprising a seat 352 and a back support 354. The seat 352 is supported by at least a portion of the frame 302 and more specifically by an upper or inner end or portion 333' of the rear leg structure 333 as well as other cooperatively disposed portions of the frame 302, such as one or more cross braces or members 335. The seat 352 is connected to the frame 302 in the manner described so as to be securely supported on the frame 302 until or unless the chair assembly 350 is disassembled or separated from the frame 302.

In contrast, the back support 354 is movably or pivotally attached preferably about a lower junction or connection area 360 located on each of the lower corners of the back support 354 generally adjacent the junction of the seat 352 and the back support 354. Moreover, back support 354 may be positioned in the orientation demonstrated in FIGS. 16 and 17 when the adjustable portion or adjustable frame segment 370 is disposed in a first orientation as also demonstrated in FIGS. 16 and 17. As such, the first orientation of the adjustable frame segment 370 facilitates or enables the use of the mobile support assembly 300 as a walker as demonstrated. In contrast, the adjustable frame segment 370 may be disposed in a second orientation represented in FIG. 15 wherein the adjustable frame segment 370 is disposed in substantial alignment with the handle assembly 314 and within the spacing 318 between the individual spaced apart handles 316.

The mobile support assembly of the present invention includes an additional structure which facilitates the secure but removable disposition of the adjustment frame segment 370 in each of the first and second orientations. More specifically and with primary reference to FIGS. 16, 21 and 24, each of the armrest structures 380 includes an outer end generally indicated as 390 having an indented area 392 which serves to form an outwardly and/or laterally projecting lip or like structure, as at 394. As best shown in FIG. 16, each of the inwardly projecting ends 390 of the oppositely disposed, spaced apart armrests 380 are disposed in interruptive relation to the opposite sides of the adjustable frame segment 370. Accordingly, when the frame segment 370 is in the aforementioned first orientation, the sides will abut against and be retained by the projecting lips 394 of the inwardly extending or projecting ends 390 of each of the armrests 380. With further reference to FIG. 16, the adjustable frame segment 370 is maintained in the second orientation, as demonstrated in FIG. 20, by the provision of outwardly extending hook-like brackets or like structures 396. Each of the brackets 396 is attached to one of the two spaced apart side members of the adjustable frame segment 370. Further, each of the brackets 396 is disposed to engage the lower side frame segment 310 about an upper end thereof as at 310'. Accordingly, when the adjustable frame segment 370 is in the second orientation the outwardly extending brackets 396 each engage a correspondingly positioned one of the upper ends 310' of the lower side frame segments 310 so as to retain the adjustable frame segment 370 in substantially aligned relation with and between the handles 316.

It is also emphasized that the configuration, dimension and placement of the armrest 380 determines the position and/or angular inclination of the adjustable frame segment 370 when in the aforementioned first orientation, such as when the mobile support assembly 300 is being used as a walker. It is further emphasized that hook like brackets 396 may assume a variety of different structural configurations such as a U-shaped structure having a certain inherent flexibility or bias, so as to effectively clip onto or otherwise be removably connected to the upper ends 310' of the lower side frame segments 310, as described above.

Therefore, the first orientation of the adjustable frame segment 370 is defined by its inward, substantially angular orientation towards the leading portion of the frame 302 and away from the trailing portion thereof and handle assembly 314. The first orientation of the adjustable frame segment 370 is further defined by its substantially overlying, spaced relation above the seat 352 and the back support 354, when the back support 354 is disposed in confronting engagement with the seat 352, as clearly represented in FIGS. 16 and 17. Accordingly, when the mobile support assembly 300 is intended for use as a walker, the adjustable frame segment 370, being in its first orientation, allows access through the spacing 318 to the exterior surface of the back support 354. As such, the back support 354 may be used as a temporary seat or like support area, on which an individual may rest while assuming a seated position. Concurrently, a cushion or pad 372 may be mounted on the upper end of the adjustable portion or frame segment 370 to serve as a back rest for an individual while that individual is supported in a seated orientation on the back support 354.

With primary reference to FIG. 15, when the adjustable frame segment 370 is in the second orientation it is disposed upright substantially within the spacing 318 in aligned relation with the handle assembly 314 and the spaced apart handles 316. Similarly, the back support 354 is disposed in an upright orientation as represented and may be at least partially supported on or by the adjustable frame segment 370 when it is in the second orientation. As such, the chair assembly 350 is readily accessible thereby enabling and facilitating the use of the mobile support assembly as a wheelchair, as described.

Figure 19:
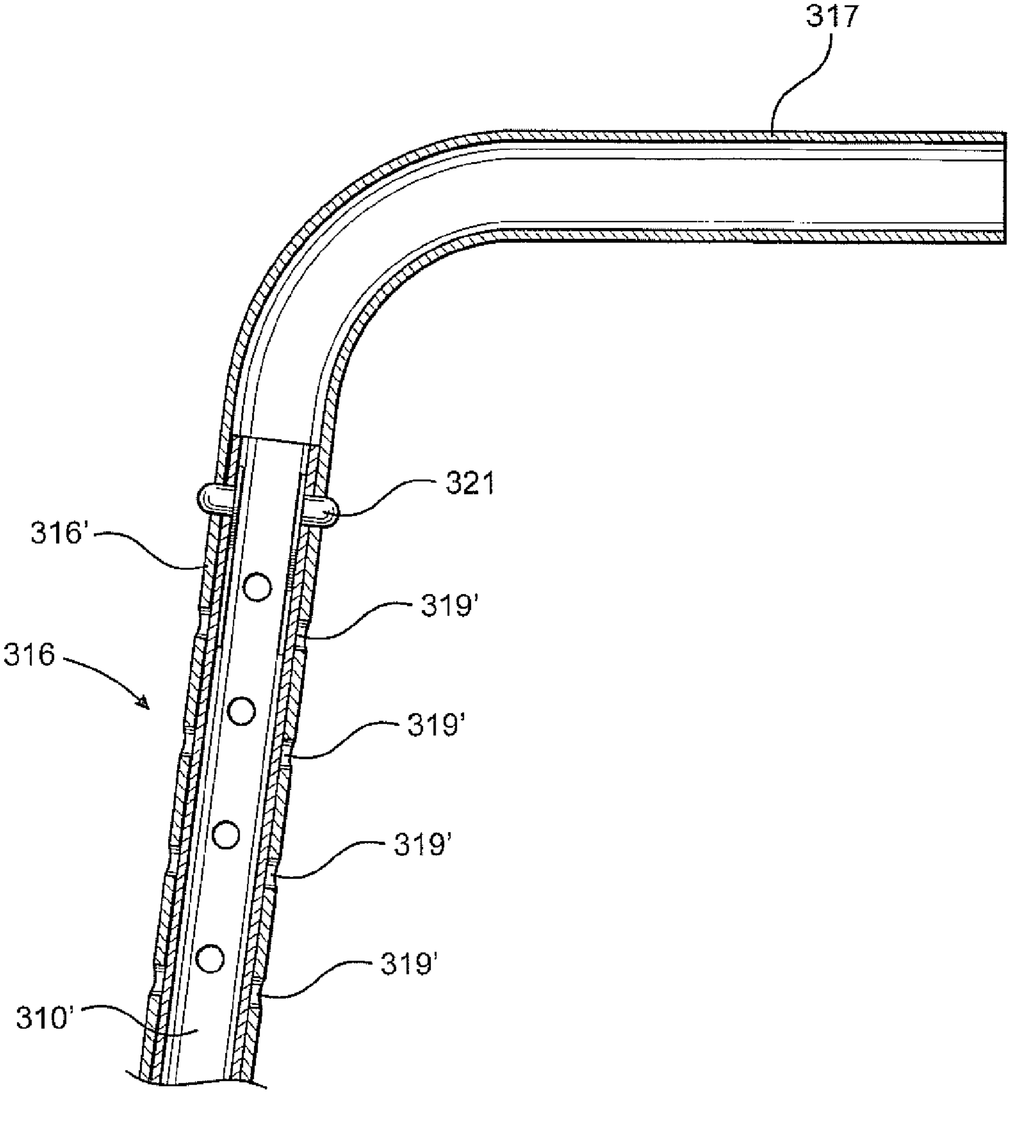
FIG. 19 is a detailed view in partial cutaway of one handle of an adjustable handle assembly, the position of which may be selectively varied.
Figure 20:
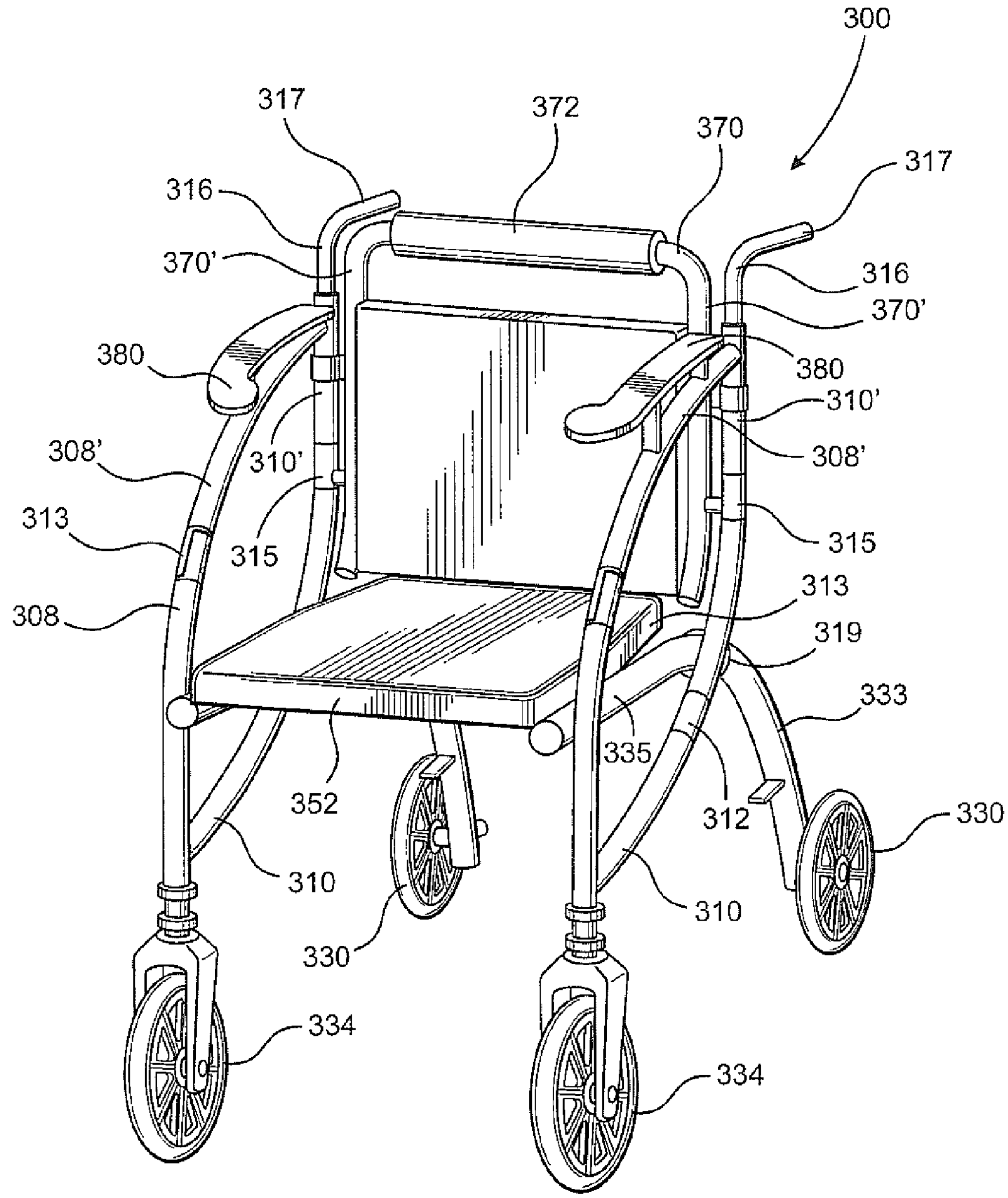
FIG. 20 is a perspective view of yet another preferred embodiment of the present invention structured to efficiently assume a compact orientation of significantly reduced size so as to facilitate storage and/or transport.
Figure 21:
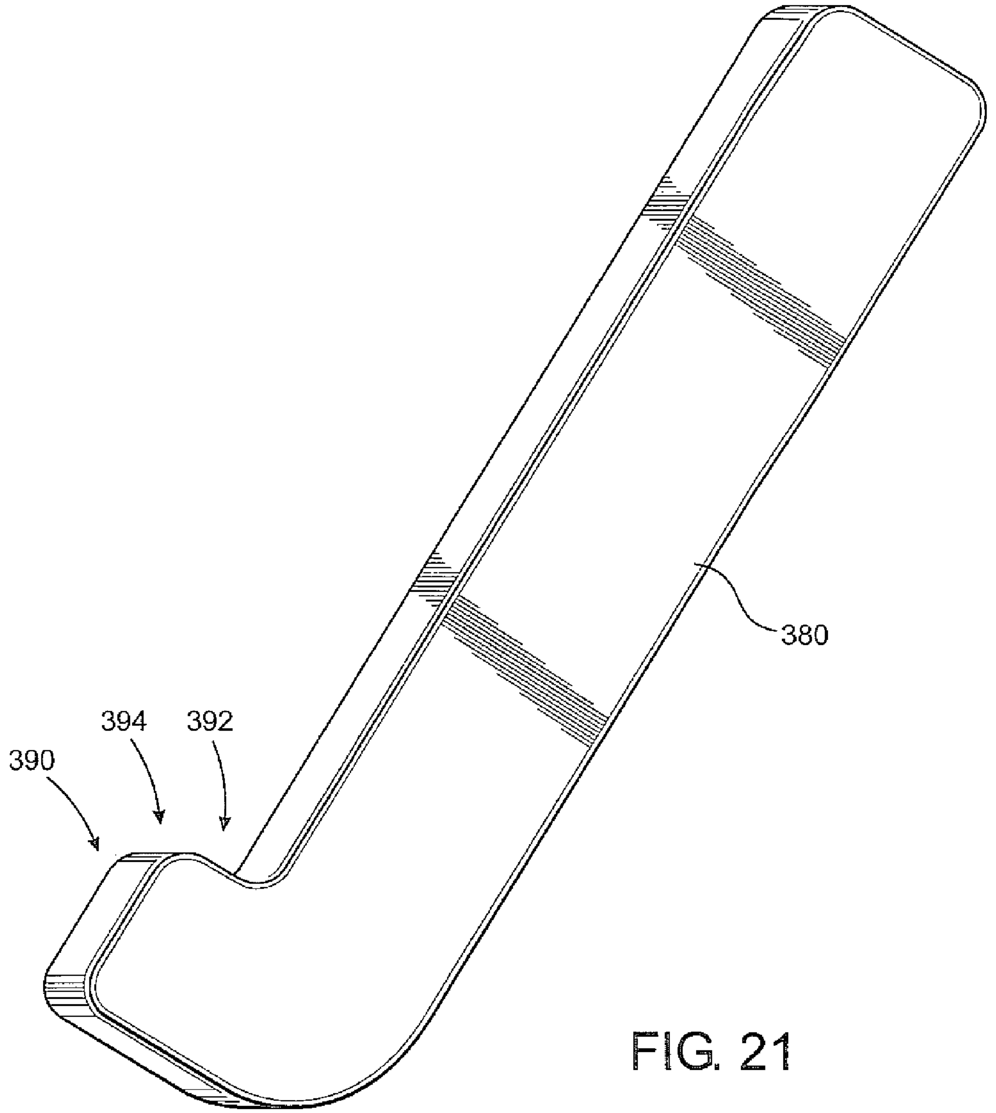
FIG. 21 is a perspective view in detail of an armrest associated with the preferred embodiment of FIG. 20 as well as other embodiments described hereinafter.
Figure 24:
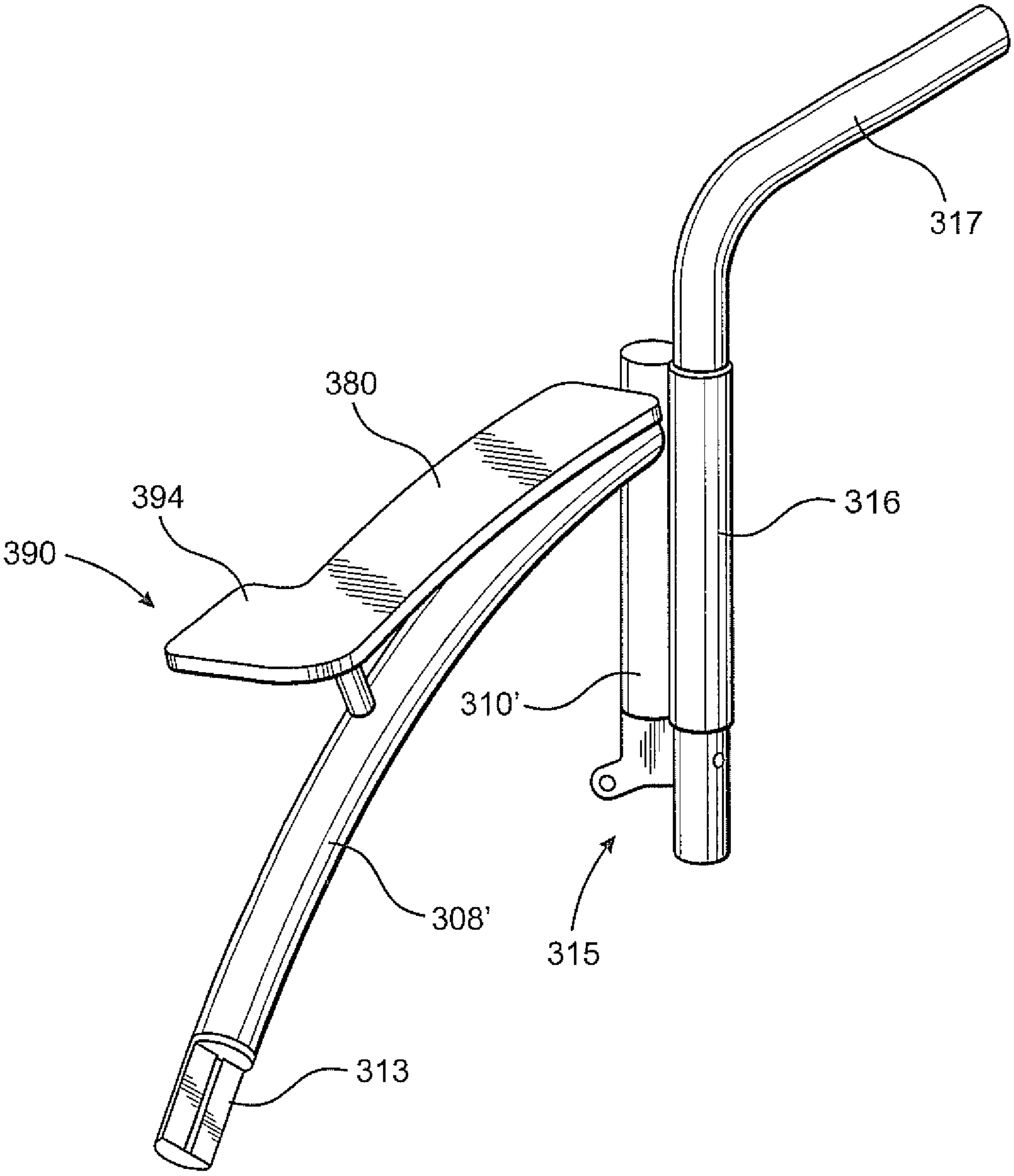
FIG. 24 is a perspective view in detail of one of two side frame segments connected to the handle assembly and an armrest of the embodiment of FIG. 20.

Other structural and operative features which are at least partially similar to the embodiments of FIGS. 1 through 14 include the vertical adjustment or removal of the handle assembly 314 by facilitating the vertical adjustment of each of the handles 316. As such, the elongated portions of the handles 316 may include a plurality of apertures as at 319, each of which may receive a spring biased lock member 321 disposed on the interior of the elongated portion 316' of the handle 316, or within the upper end 310' of the lower side frame segment 310 so as to facilitate the vertical adjustment of the grips or handlebar portions 317. A structural modification of the handle assembly 314 and an associated portion of the frame are represented in FIG. 24. As disclosed each of the handles 316 may be connected in an immediate adjacent relation to the upper end 310' of the lower side frame segment 310, rather being connected in axial alignment therewith, as represented in FIGS. 16, 19 and 20. In either structural variation, the handles 316 may be vertically or longitudinally adjusted along their respective lengths so as to adapt to different individuals, which are positioned to propel the mobile support assembly 300 in any preferred direction. FIGS. 16 and 17 further demonstrate the adjustable features of the handle assembly 314 wherein each of the handles 316 are located at a different height. Disengagement of the biased lock member 321 from any of the apertures 319 allows the complete removal of the handles 316 from the frame.

As set forth above, the present invention demonstrates significant versatility by virtue of its multi-use construction as well as the structuring of the various components thereof so as to facilitate the mobile support assembly 300 being easily and quickly disposed into the stored orientation. As such, various components, to be described in greater detail hereinafter, may be selectively disposed from their normal, operative orientation, whether the mobile support assembly 300 is used as a walker or a wheelchair, or into a compact position so as to at least partially define the stored orientation.

By way of example, the rear legs 333 and the rear wheels 330 associated therewith are adjustably interconnected to the remainder of the frame 302 and more specifically to the frame segments 333' used to at least partially support the seat 352. This adjustable and movable interconnection is accomplished through the provision of hinge like connector structures 319 which allow the rear legs 333 to be folded inwardly, substantially under the seat 352 or a portion of the frame 302 associated with the seat 352.

Figure 22:
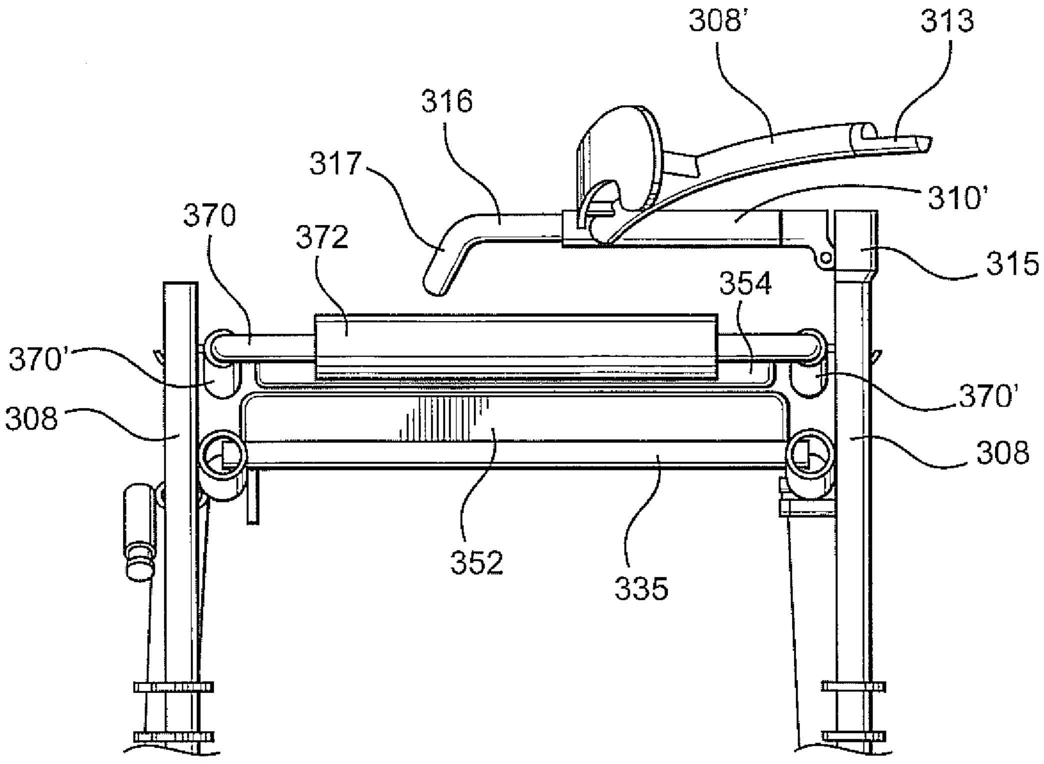
FIG. 22 is a detailed view in partial cutaway of the embodiment of FIG. 20, wherein certain structural components thereof are disposed in a collapsed and compact orientation.
Figure 23:
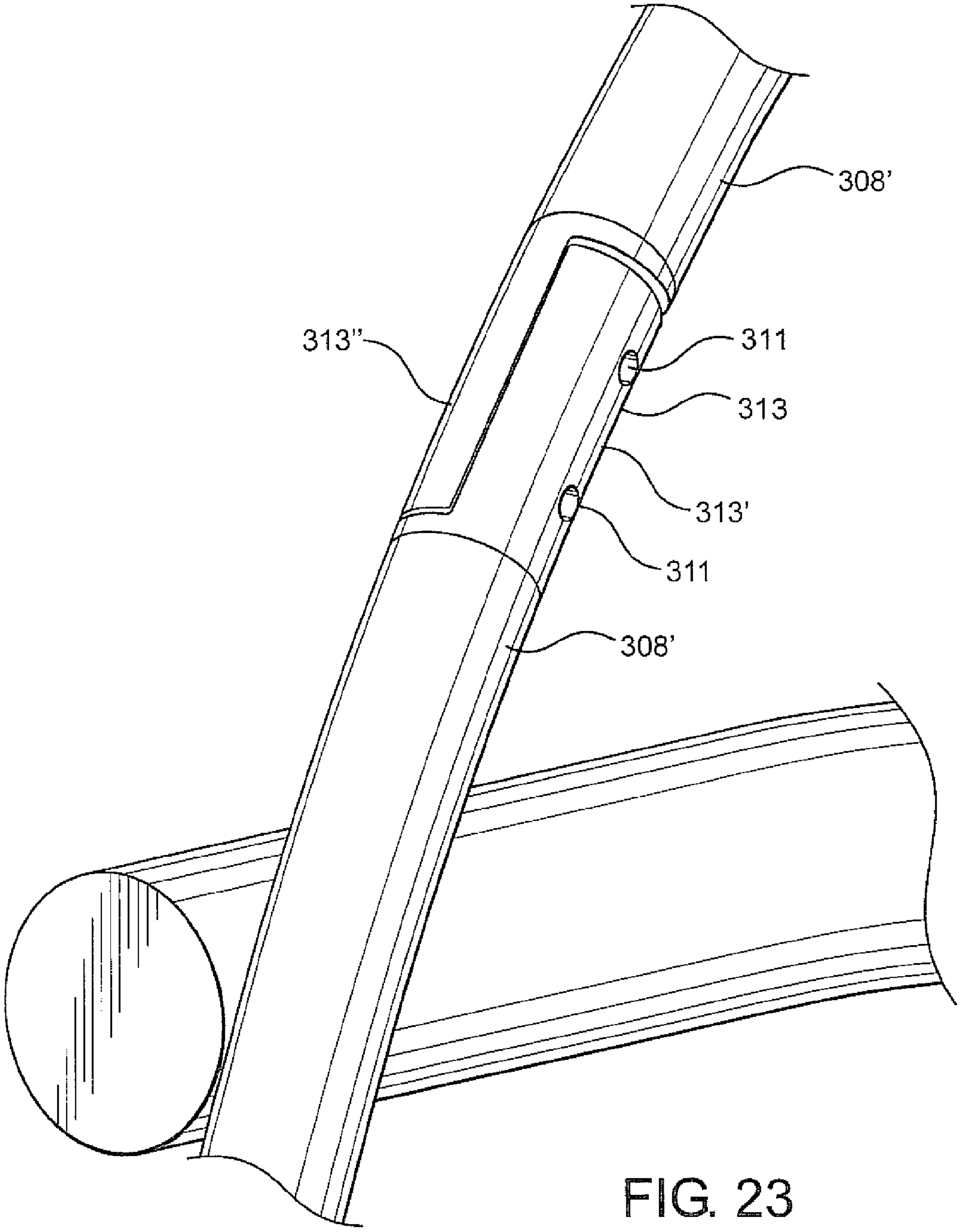
FIG. 23 is a detailed view in partial cutaway of a connector associated with the collapsible nature of the embodiment of FIG. 22.

Selective positioning of various portions or components of the frame 302 in the aforementioned stored orientation is further demonstrated in FIGS. 22 through 24. As shown therein, the stored orientation may also be partially defined by the back support 354, the adjustable frame segment 70, the handles 316, arm rests 380 and upper ends 308' and 310' of the upper and lower side frame segment 308 and 310 respectively, being disposed in predetermined relation to one another, as described in greater detail hereinafter. More specifically and with reference to FIG. 24, fixedly interconnected portions of frame 302 include the arm rest 380 connected to and support by the upper end 308' of the upper side frame segment as well as the upper end 310' of the lower side frame segment and the correspondingly positioned handle 316. This collection of components represents a "sub-unit" of the frame 302 which may be collectively positioned between an operative orientation as demonstrated in FIG. 20 and a collapsed position as demonstrated in FIG. 22, wherein portions of the frame 302 assume the aforementioned stored orientation.

In order to accomplish the compact position of the sub-unit demonstrated in FIG. 24, a plurality of connectors 313 and 315 are disposed and structured to movably or adjustably connect the sub-unit of FIG. 24 to the remainder of the frame 302. More specifically, as represented in FIG. 23, the connector 312 is separable and comprises removably attached portions 313' and 313". A secure but removable connection or attachment of the connector segments 313' and 313" may be accomplished utilizing a retaining connector or bracket 220 as disclosed and described in detail with reference to the embodiment of FIGS. 9 and 14. As such, a central member or shaft 222 associated with the separate retaining connectors 220 passes through apertures 312 formed in the connector segment 313' and extend into the interior of segment 313". The curved arms 224 and 226 of separate ones of the retaining connectors 220 will thereafter surround the segments 313' and 313" when in the connected or assembled position as demonstrated in FIG. 23. The removal of the retaining connector 220 will allow the segments 313' and 313" to be separated, wherein segment 313" is fixedly or integrally connected to the lower extremity of the upper end 308' of the upper side frame segment as disclosed in FIG. 22. In addition, a hinge type connector 315 is structured such that the upper end 310' of the lower side frame segment 310 is pivotal inwardly in overlying relation to the seat 352 as well as the back support 354 and adjustable frame segment 370 when the back support 354 and the frame segment 370 are disposed in overlying and/or confronting relation to the seat 352 as clearly disclosed in FIG. 22.

It is recognized that FIG. 22 discloses only one of the sub-units represented in FIG. 24 as being disposed in the compact position. However, FIG. 22 is intended to be representative of the structural and operative features of both of the oppositely disposed sub-units represented in FIG. 24, located on opposite sides of the mobile support assembly 300. As such, both of the FIG. 24 sub-units are pivotal or foldable inwardly into a compact position, so as to at least partially define the aforementioned stored orientation.

It is also recognized that the adjustable frame segment 370 is normally or typically retained in its first orientation, as represented in FIG. 16, by the inwardly projecting lip 394 of the end 390 of each of the arm rests 380. However, in order for the adjustable frame segment 370 to assume the position demonstrated in FIG. 22 the arm rest 380 may be forced at least a minimal distance outwardly such that side portions 370' of the adjustable frame segment 370 may pass beyond the inwardly projecting ends 390 of each of the arm rests 380 to assume the folded or collapsed position demonstrated in FIG. 22.

The selective and efficient disposition of certain components or portions of the frame 302 in a collapsed position so as to define the stored orientation of significantly reduced dimension thereby greatly facilitates the storage or transport of the mobile support assembly 300. In addition, the overall configuration and dimension of the mobile support assembly 300 is sufficiently reduced so as to allow its placement in small storage or travel carton or container of a size which renders the storage or transport of the mobile support assembly 300, when in the stored orientation, effective and efficient.

Yet another most preferred embodiment of the present invention comprises a mobile support assembly generally indicated as 400, being primarily in the form of a walker assembly. The support assembly 400 comprises a frame generally indicated as 402 which is structured to include a seat 142 as well as a depending compartment 148 located beneath the seat 142 as clearly disclosed in the additional preferred embodiments of FIGS. 1-3. For purposes of clarity and accurately describing the various components of the frame 402, the seat 142 and the compartment 1488 are not shown in FIG. 25 through 27. However, it is emphasized that the overall frame structure, as will be apparent hereinafter, is clearly adapted for receipt of the seat 142, compartment 148 and backrest portion 146. More specifically, the seat 142 is designed to be connected to and partially supported on the cross bars 404 by appropriate connecting strips as demonstrated in FIGS. 1-3 or by other appropriate connecting structure. As such, the compartment 148 will be located beneath the seat 142 and between the crossbars 404 in somewhat of a dependent relation to the seat 142.

Further, the frame 402 includes the back support member 406 on which the back supporting pad 146 is mounted. The frame also includes a front wheel assembly, generally indicated as 408 and a rear wheel assembly, generally indicated as 410. As with the embodiments of FIGS. 1-3, the front leg assembly 408 includes two spaced apart legs 409 which vary in dimension and/or configuration relative to the embodiment of FIGS. 1-3.

More specifically, each of the legs 409 includes an elongated upper or primary portion 409' and a fixedly or integrally connected lower portion 412. As is clearly represented in FIGS. 25 through 27, the upper portion 409' is angularly oriented relative to the lower portions 412. Further, the lower portion 412 is disposed in a substantially upright or at least partially vertical orientation when the frame 402 is disposed in an upright, operative orientation as represented in the accompanying figures. In contrast, the two spaced apart legs 411 at least partially define the rear leg assembly 410. The rear legs 411 differ in dimension and configuration from the front legs 409 in that they have substantially linear, elongated configuration with a greater longitudinal dimension then the overall length of the front legs 409. Accordingly, each of the rear legs 411 include a lower portion 413 disposed in coaxial alignment with the primary or upper portion thereof.

Figure 25:
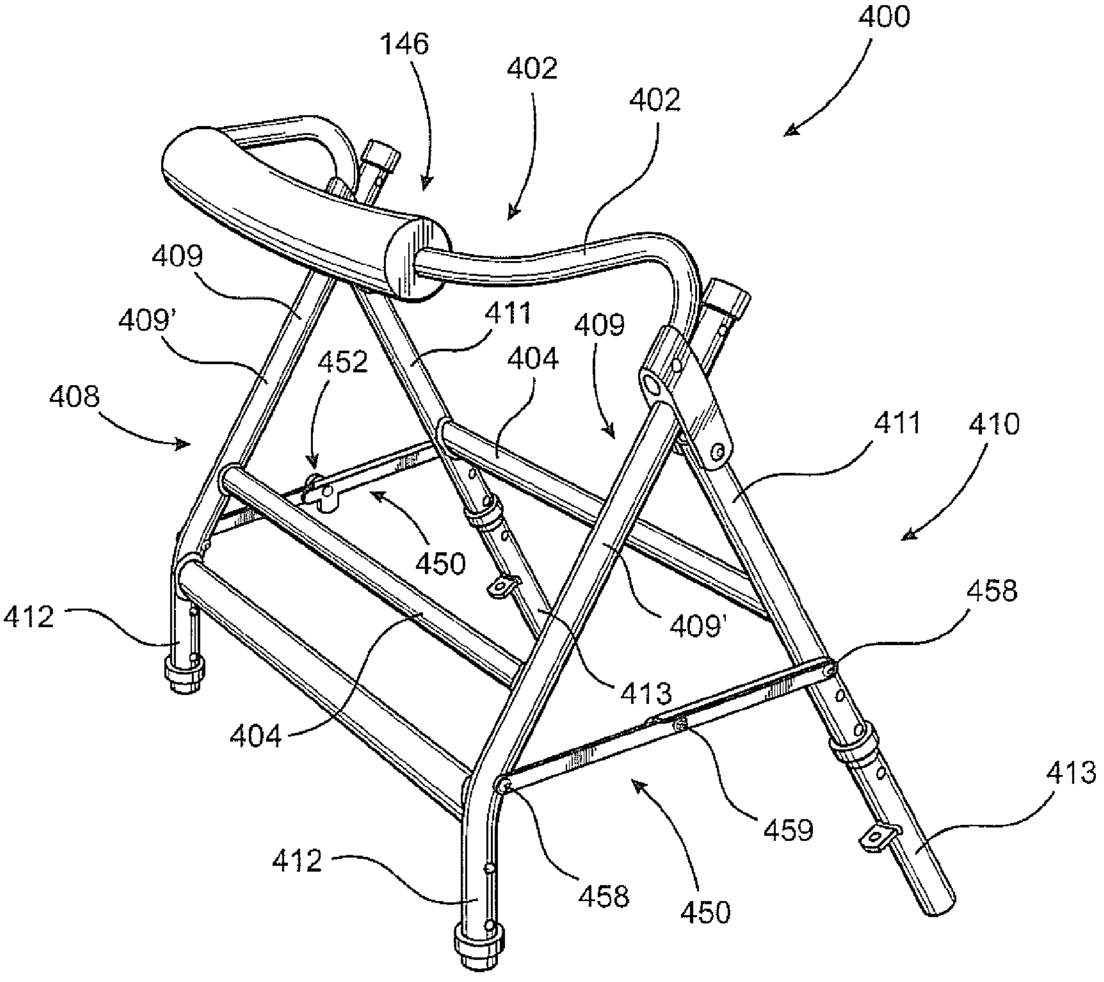
FIG. 25 is a perspective view of yet another preferred embodiment of the mobile support assembly of the present invention, in the form of a walker and including a frame and associated components, absent the attachment of normally included wheel assemblies.
Figure 26:
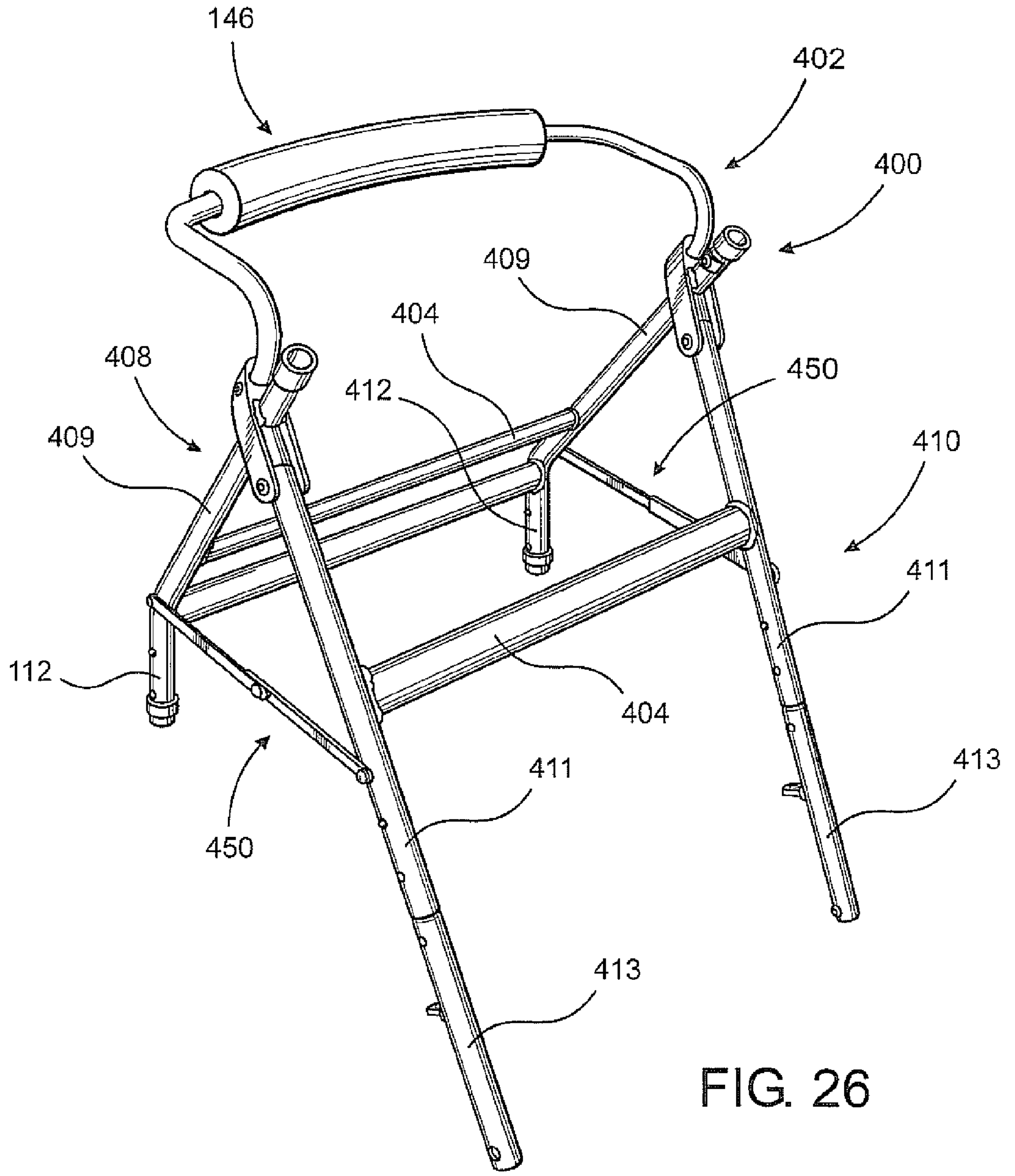
FIG. 26 is a rear perspective view of the embodiment of FIG. 25.
Figure 27:
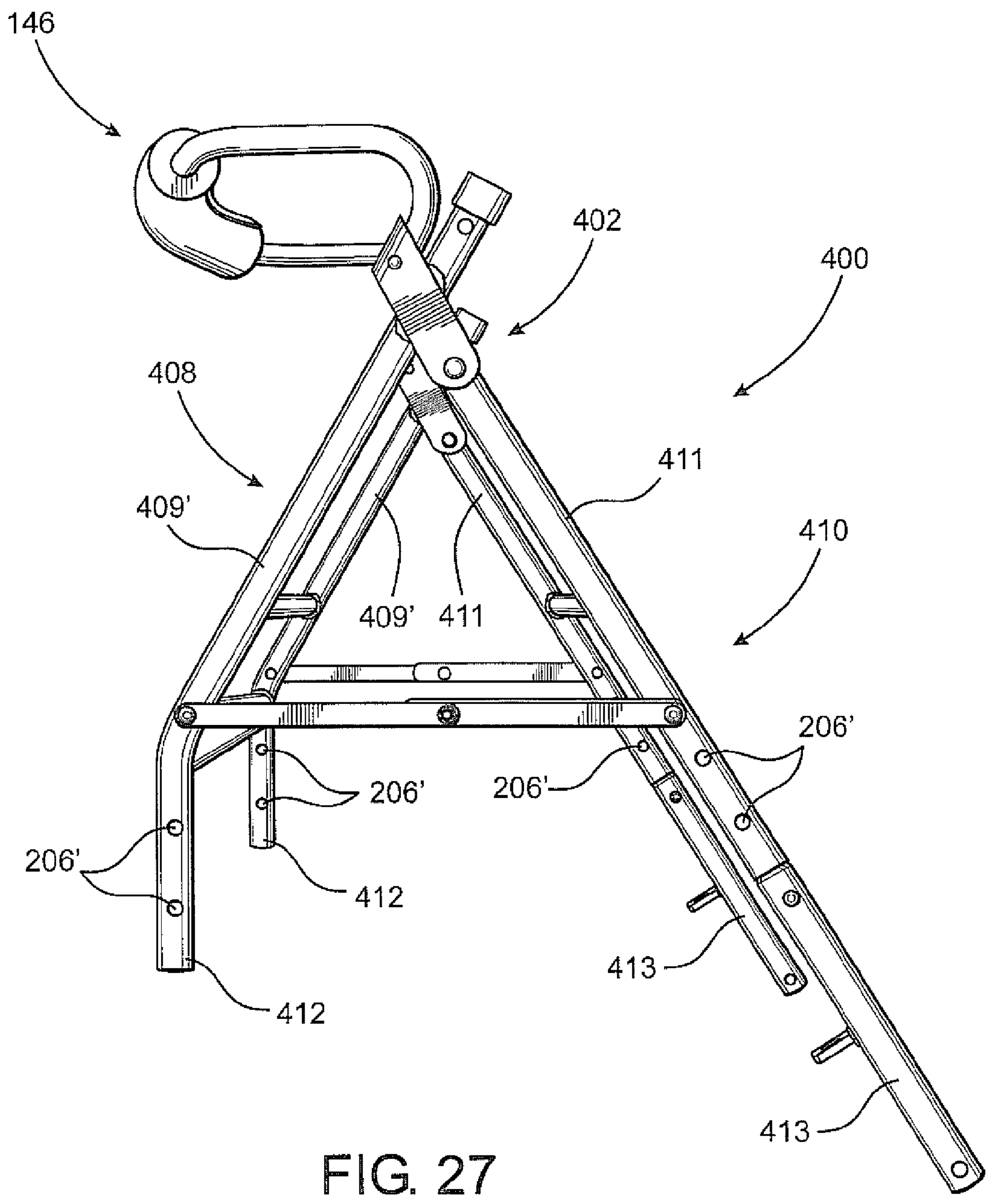
FIG. 27 is a side view of the embodiment of FIGS. 25 and 26.
Figure 28:
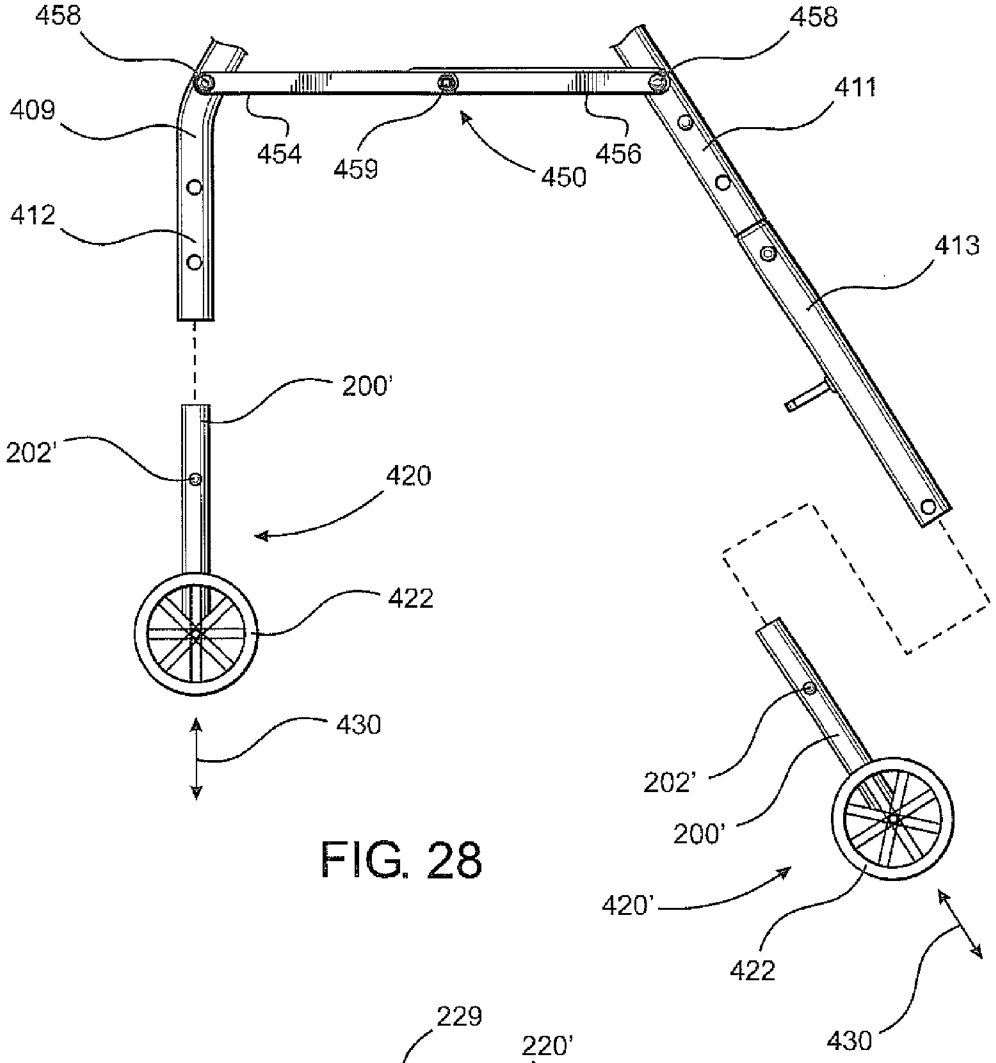
FIG. 28 is a perspective view in partial cutaway of portions of both front and rear leg assemblies of the embodiments of FIGS. 25 through 27 with corresponding wheel assemblies in a position to be mounted thereon.

As set forth above, frame 402, as represented in FIGS. 25 through 27, is absent the inclusion of front and rear wheel assemblies 420 and 420' respectively. With specific reference to FIG. 28 and as similarly represented in the embodiments of FIGS. 1-3, each of the legs 409 and 411 include front wheel assemblies 420 and rear wheel assemblies respectively connected to corresponding lower portions 412 and 413. Each of the wheel assemblies 420' has an elongated connecting shaft 200' and appropriately sized wheel structure 422. Moreover, each of the front legs 409 of the front leg assembly 408 includes a wheel assembly 420 secured to the lower portions 412 thereof. Similarly, each of the rear legs 411 include individual wheel assemblies 420' connected to the lower portion 413 thereof. Accordingly, the support assembly 400 can be said to have a front wheel assembly defined by two of the wheel assemblies 420 and a rear wheel assembly defined by an additional two wheel assemblies 420' connected to the lower portions 412 and 413 of the respective front and rear legs 409 and 411.

One feature of the walker of the mobile support assembly 400 is the ability to efficiently adjust the height of the frame 402 relative to any supporting surface on which the frame 402 is positioned as demonstrated in FIGS. 25-27. Accordingly, the varying of the height of the frame 402 relative to any supporting surface facilitates its use by individuals of varying heights and sizes, whether the user/individual is standing or sitting the support on the seat 142. Such variable height adjustment of the frame 402 is accomplished by virtue of the fact that the front wheel assemblies 420 and the rear wheel assemblies 420' and each of the wheel structures 422 associated therewith are adjustably and removably connected to the respective lower portions 412 and 413 of the front and rear legs 409 and 411.

Figure 30:
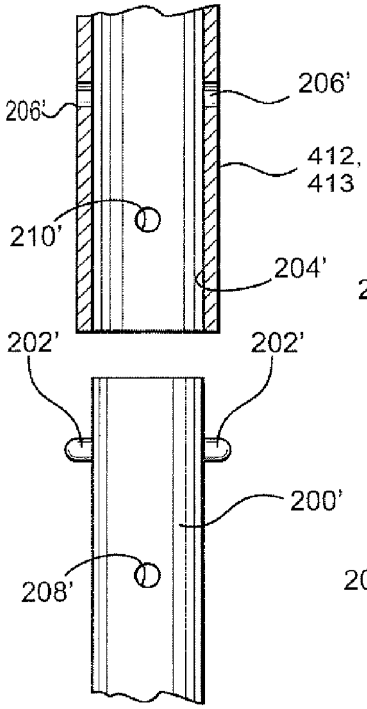
FIG. 30 is a front view in partial cutaway of corresponding connecting portions of the front and/or rear leg assemblies with the front and/or rear wheel assemblies of the embodiment of FIGS. 25 through 28.
Figure 31:
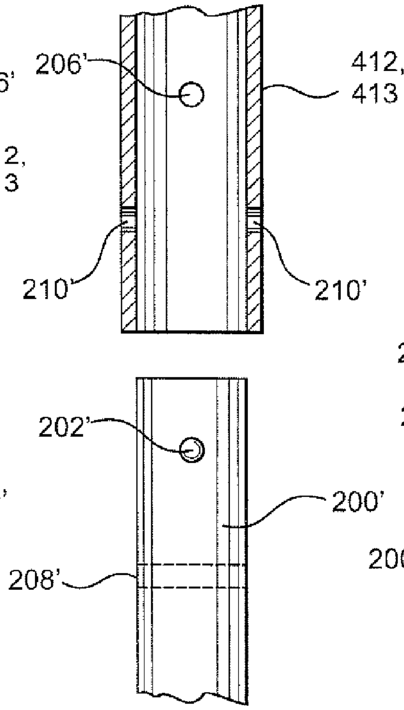
FIG. 31 is a side view in partial cutaway of the embodiment of FIG. 30.
Figure 32:
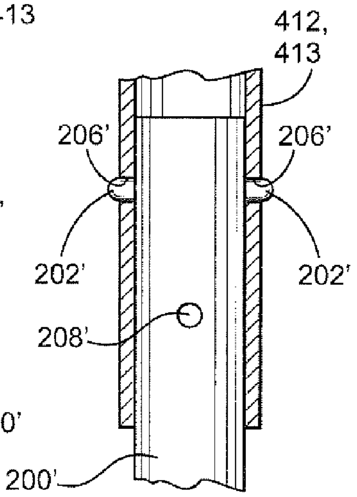
FIG. 32 is a front view in partial cutaway of the embodiment of FIGS. 30 and 31 in a connected or assembled position.

For purposes of clarity the structures represented in FIGS. 30 through 32 are intended to depict a single one of the lower leg portions 412 and 413. However, it is emphasized that in describing this particular structure, each of the front and rear legs 409 and 411 is the duplicate or structural equivalent of one another, at least in terms of establishing an adjustable interconnection with corresponding ones of the wheel structures 422 and associated shaft 200'. Accordingly, the description of one lower leg portion is meant to be descriptive of each of the corresponding leg structures.

Accordingly, the transverse dimension of each of the shafts 200' is at least minimally less than the interior transverse dimension of the lower portions 412 and 413 of the front and rear legs 409 and 411. This relative dimensioning allows the shaft 200' to be inserted within and removed from the interior of the lower portions 412 and 413 as demonstrated by a comparison of the unassembled and assembled structures respectively represented in FIGS. 30 through 32. Further, the shaft 200' includes spring biased fingers 202' which are retractable, at least partially, into the interior of shaft 200' as they pass along the interior surface 204' of the lower portions 412 and 413 of the front and rear legs. However, upon the spring biased fingers 202' being aligned with coaxial apertures 206', the fingers 202' will expand outwardly thereby removably locking or retaining the shaft 200' within the interior of the lower portions 412 and 413. Removal of the shaft 200' from the interior of the lower portions 412 and 413 is accomplished by inwardly depressing the fingers 202' such that they are removed from the apertures 206' and are allowed to slide along the interior surface 204'. Once the fingers 202' are aligned with and extend outwardly from the apertures 206', apertures 208' and 210' respectively formed in the shaft 200' and the lower portions 412 and 413, will be axially aligned. Such axial alignment between the apertures 208' and 210' will facilitate the connection of a retaining connector or bracket 220' as represented in FIG. 29, in its intended, retaining position.

By virtue of this adjustable and variable connection as demonstrated in FIGS. 30 through 32, the height of the frame 402, such as when it is in its operative position as demonstrated in FIGS. 25 through 27, can be easily varied or adjusted to accommodate users of various sizes and heights merely by placing the fingers 202' in different ones or pairs of the apertures 206'. To facilitate an adjustment of the frame 402 at different heights, the lower portions 412 and 413, or other portions of the legs 409 and 411 include a plurality of such pairs of apertures 206'. Accordingly, the corresponding wheel assemblies 420 and 420' can extend outwardly from and along the length of each of corresponding ones of the legs 409 of the front leg assembly 408 and corresponding ones of the legs 411 of the rear leg assembly 410. Such variable outward extension is schematically represented by directional arrows 430 in FIG. 28.

Figure 29:
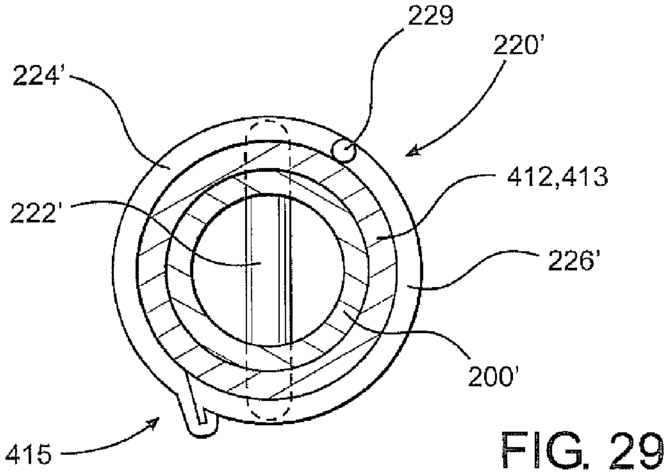
FIG. 29 is a top sectional view of another embodiment of a retaining connector similar to but distinguishable from the embodiment of FIGS. 13 and 14.

With primary reference to FIG. 29, a retaining connector or bracket 220' is disposed and structured to reliably but removably retain the intended connection between the wheel assemblies 420 and 420' and the corresponding legs 409 and 411 of the front and rear leg assemblies 408 and 410. Accordingly, the retaining connector 220' comprises a central connecting pin 222' spaced on the interior of curved arms 224' and 226'. This embodiment is structurally distinguishable but functionally similar from the retaining connector or bracket 220 represented in FIG. 9. As such, either embodiment of the connecting bracket can be used with one or more of the different preferred embodiments of the present invention, as set forth herein.

More specifically, the curved arms 224' and 226' have a sufficient longitudinal dimension so as to surround a portion of the front or rear legs, as at 412, 413 thereby further facilitating the placement of the connecting pin 222' in its intended retaining position as it extends through aligned apertures 210', formed in the leg portions 412, 413, and 208', formed in the shaft 200', when the shaft 200' and leg portions 412, 413 are assembled as represented in FIGS. 29 and 32. In addition, the free ends of each of the curved arms 224' and 226' include a connector or latch configuration 415, which enables the free ends to be removably connected to one another. The provision of the latch configuration 415 at the free ends further serves to maintain the retaining connector or bracket 220' in its intended operative position. Moreover, when in its operative position of FIG. 29, the retaining pin 222' serves to prevent inadvertent removal or relative positioning of the shaft 200' from its intended, retained placement within the corresponding leg portion 412, 413, as set forth above.

Figure 33:
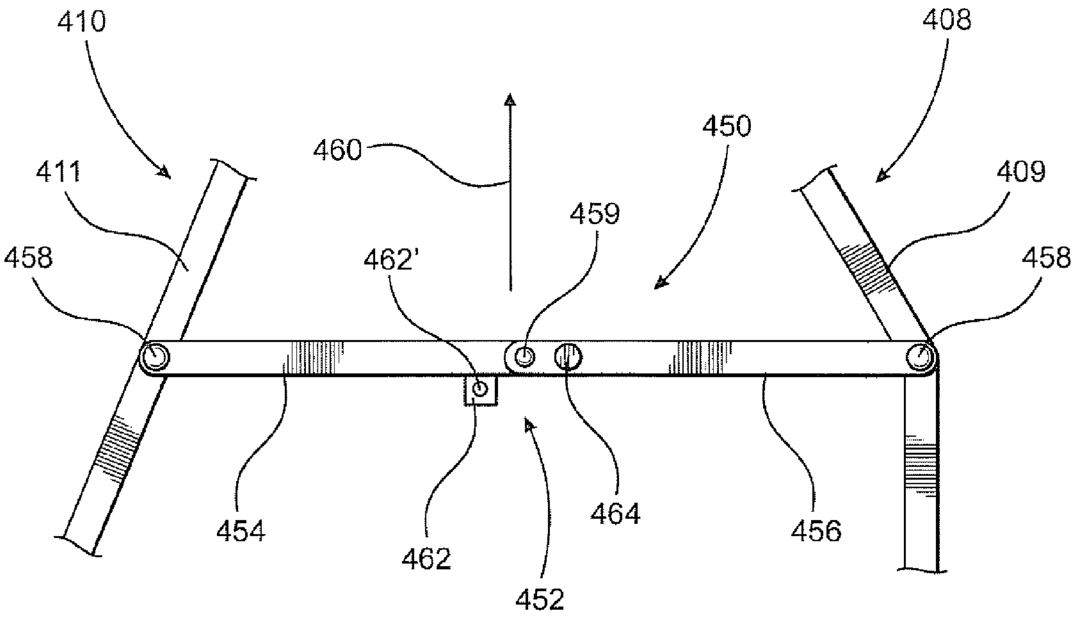
FIG. 33 is a side view in partial cutaway of a bracket assembly associated with the front and rear leg assemblies of the embodiment of FIGS. 25 through 29, when the support assembly is in an operative orientation.
Figure 34:
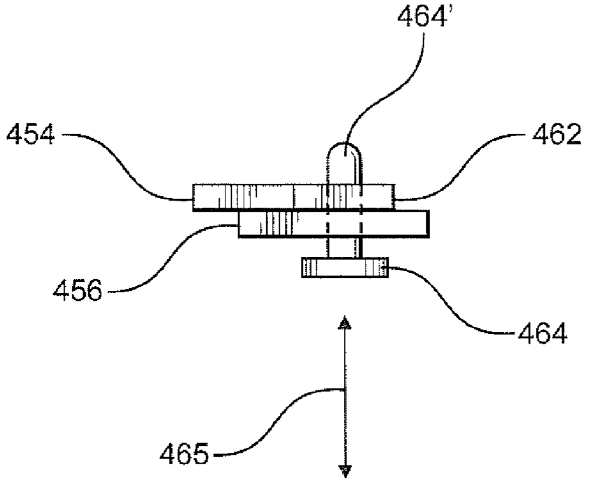
FIG. 34 is a top end view of the embodiment of FIG. 33 when in the bracket assembly is in a folded position so as to dispose the support assembly of the embodiment of FIGS. 25 through 29 in a stored orientation.

Yet another feature of the present invention is demonstrated in FIGS. 33 and 34. More specifically, the mobile support assembly 400 and the frame 402 include a bracket assembly generally indicated as 450. The bracket assembly 450 is movably interconnected between the front leg assembly 408 and the rear leg assembly 410. In a most preferred embodiment and as represented in FIGS. 25-27, two such bracket assemblies 450 are provided. However, it is within the spirit of scope of the present invention that the mobile support assembly 400, being primarily in the form of a collapsible walker assembly, may include only a single one of the bracket assemblies 450.

When the frame 402 is in its operative position, the bracket assembly 450 assumes a substantially elongated, linear configuration including bracket segments 454 and 456 disposed in substantially linearly aligned relation to one another. Further, each of the bracket segments 454 and 456 have their opposite or outer, distal ends pivotally or otherwise movably connected to the corresponding legs 409 and 411 of the front and rear leg assemblies 408 and 410 respectively. The opposite or correspondingly positioned inner, proximal ends of each of the bracket segments 454 and 456 are pivotally or otherwise movably connected to one another by a pivot or linking pin 459.

Moreover, when the frame 402 is disposed from the operative position, represented in FIGS. 25-27 and 33, into a stored orientation, the bracket segments 454 and 456 will assume a folded position. The folded position of the bracket assembly 450 is more specifically described by their upward movement, as schematically indicated by the directional arrow 460. Therefore, when in the fully collapsed, stored orientation, the front and rear leg assemblies 408 and 410 are disposed in a somewhat aligned or at least coextending position as clearly demonstrated in embodiments of FIGS. 7 and 8. In such a stored orientation, the bracket segments 454 and 456 will also be somewhat aligned and disposed in coextending relation to one another as represented in FIG. 34. In order to maintain the bracket assembly 450 and more specifically the bracket segments 454 and 456 in the folded position, and thereby maintain the frame 402 in its stored orientation, a lock assembly generally indicated as 452 is provided.

The lock assembly 452 comprises a female member or portion 462 including a flange having an aperture 462' connected to and movable with one of the bracket segments, such as at 454. The lock assembly 452 further includes a male portion or member 464 including a finger or pin 464' connected to and movable with the other of the two bracket segments, as at 456. When the bracket assembly 450 is in the linearly aligned operative position represented in FIG. 33 the female portion 462 and the male portion 464 are disposed in spaced relation to one another. However, when the bracket assembly 450 is reconfigured to allow the frame 402 to assume its stored orientation, the bracket segments 454 and 456 will be disposed in at least a partially coextending position or linearly aligned relation as indicated in FIG. 34. In such position, the female portion 462 will become substantially aligned with the male portion 464 to the extent that they may be brought into movable, retaining engagement with one another.

More specifically, the female portion 462 comprises the apertured flange and the male portion 464 a spring biased, retractable finger 464'. When the aperture 462' is disposed in aligned relation with the connecting finger 464', manipulation of the male portion 464 in a reciprocal or retractable manner, as schematically indicated by directional arrow 465, will serve to dispose the retaining finger 464' through the aperture 462'. The male and female portions 462 and 464 will thereby be removably connected together facilitating maintenance of the bracket segments 454 and 456 in the folded position. When so retained, the front and rear leg portions 408 and 410 will be "locked" in the stored orientation. In order to reorient the frame 402 and more specifically the front and rear leg portions 408 and 410 in its operative position as demonstrated in FIG. 33, a manual manipulation of the spring biased, male portion 464 can be accomplished at least to the extent of removing the retaining finger 464' from the apertured 462' thereby releasing the bracket segments 454 and 456 from one another and allowing them to assume an operative, linear configuration.

Figure 35:
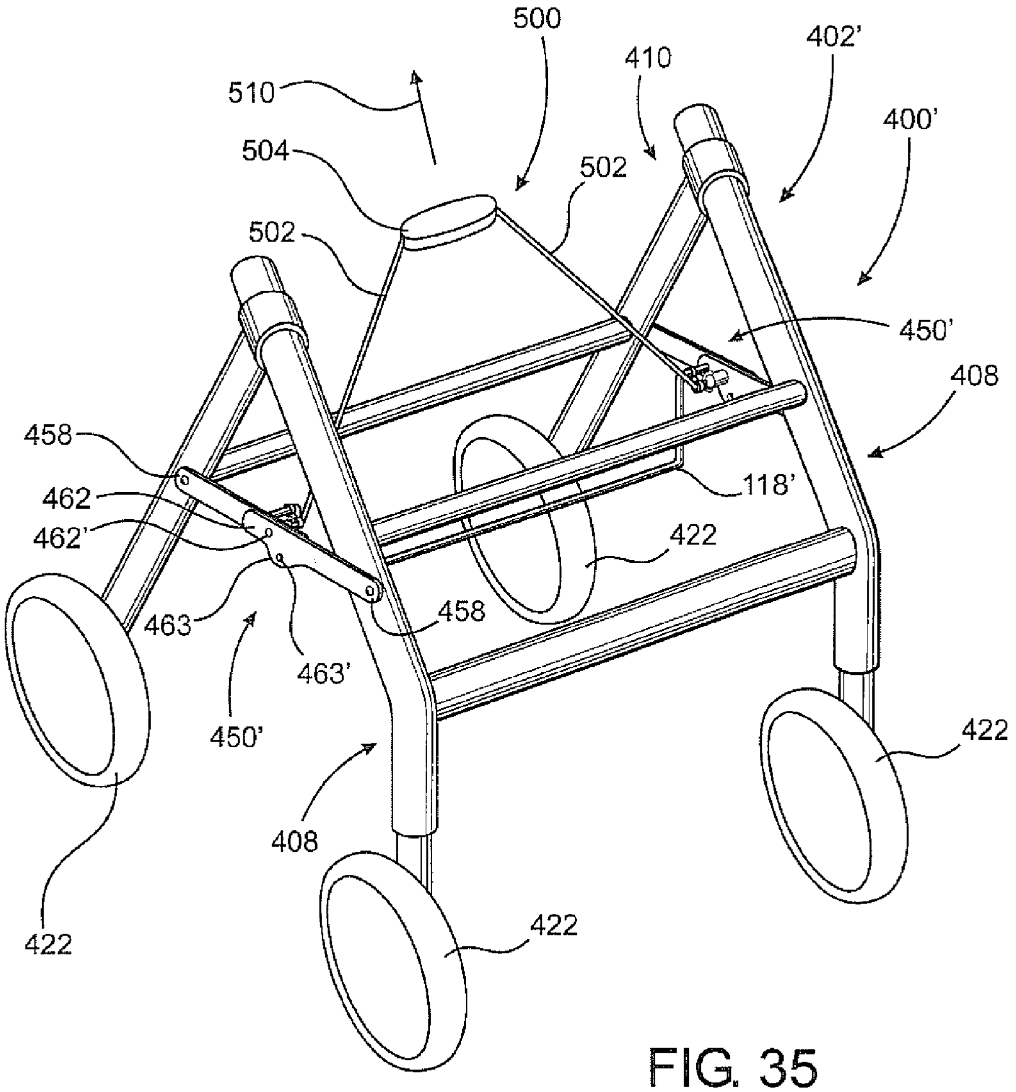
FIG. 35 is a perspective view in partial cutaway and schematic form of a yet another preferred embodiment of the mobile support assembly of the present invention.
Figure 36:
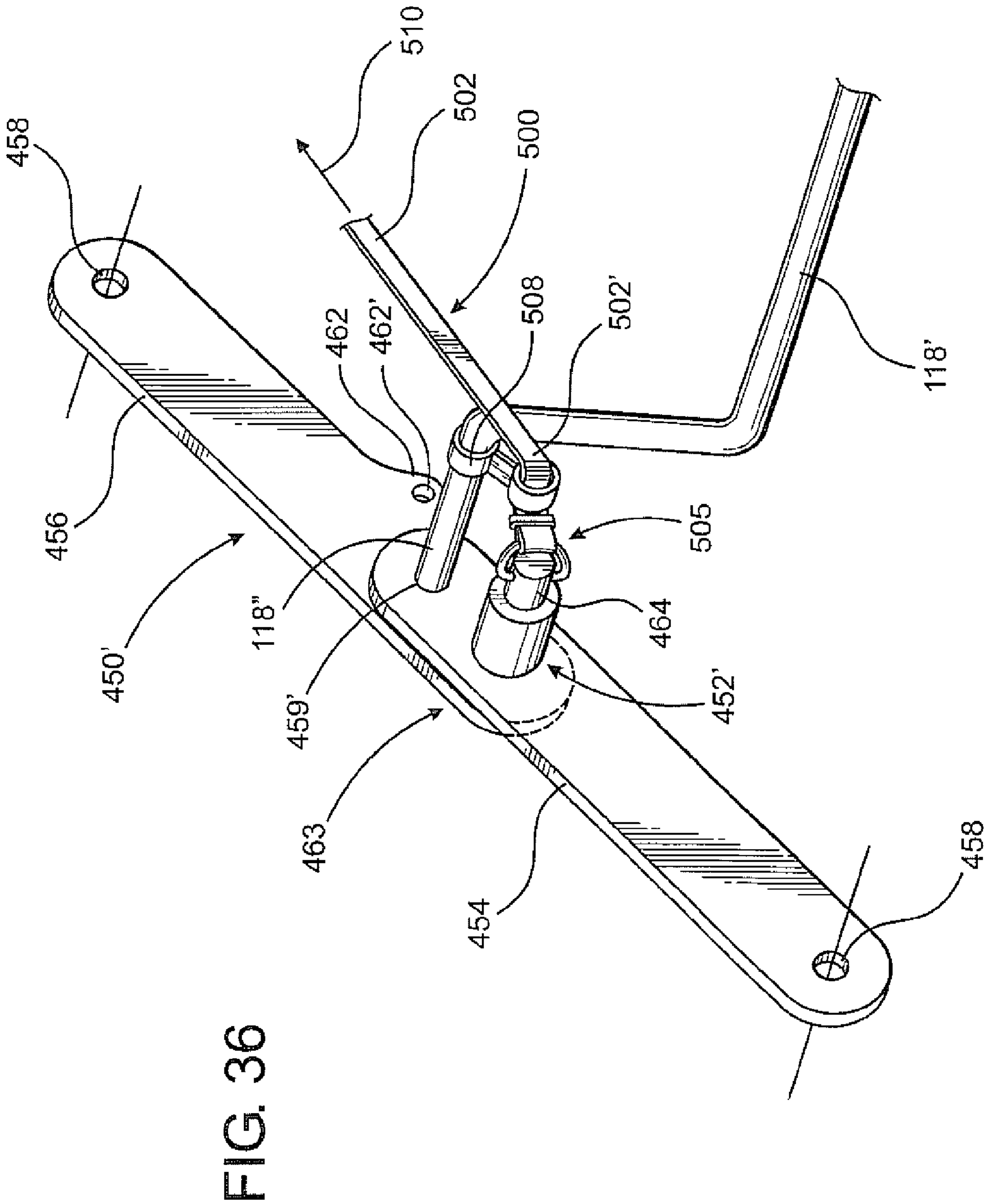
FIG. 36 is a detailed view in partial cutaway and schematic form of another embodiment of a bracket assembly and a lock assembly associated with the preferred embodiment of FIG. 35.
Figure 37:
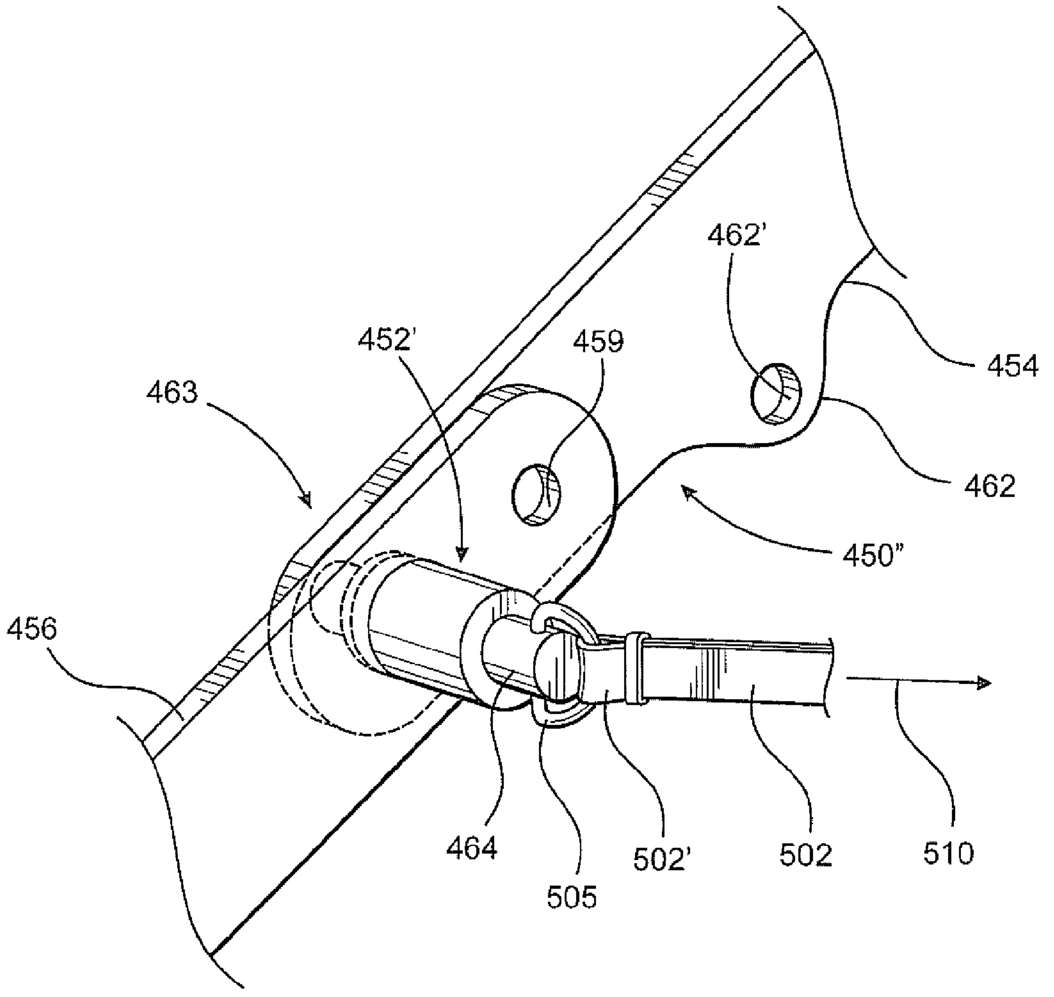
FIG. 37 is a perspective view in partial cutaway and schematic form of yet another preferred embodiment of the bracket assembly and lock assembly which may be associated with the preferred embodiment of FIG. 35.

Yet another preferred embodiment of the mobile support assembly of the present invention is represented in FIGS. 35 through 37 and is generally indicated as 400'. Similar to the embodiment of FIGS. 25 through 34, the mobile support assembly 400' includes a frame 402' having a front leg portion, generally indicated as 408 and a rear leg portion, generally indicated as 410. Appropriate wheel or roller structures 422 are connected to the front and rear leg portions 408 and 410 in a manner which may be equivalent to the structure described with regard to the embodiments of FIGS. 28 through 32. Further, the mobile support assembly 400' includes at least one bracket assembly 450' or alternatively two oppositely disposed bracket assemblies 450', each of which is operatively associated with a different side of the frame 402' of the mobile support assembly 400' as clearly represented in FIG. 35.

For purposes of clarity, the structural details, modifications and embodiments of the bracket assembly 450' will be described with reference to a single bracket assembly as represented in FIG. 36 or alternatively with a structurally modified single bracket assembly 450" as represented in FIG. 37. However, it is emphasized that whether the bracket assembly 450' or 450" is utilized, the frame of the mobile support assembly 400' may be operative by including only a single bracket assembly 450', 450" or two such bracket assemblies 450', 450".

With primary reference to the preferred embodiment of FIGS. 35 and 36, each of the one or more bracket assemblies 450' includes two bracket segments 454 and 456 having their opposite ends 458 pivotally or otherwise movably connected to the front and rear leg assemblies 408 and 410. Moreover, the two bracket segments 454 and 456 of each of the one or more bracket assemblies 450' are pivotally or movably connected to one another at corresponding ends, about a pivot connection 459 and/or 459' as represented in FIGS. 36 and 37. Further, in the preferred embodiment of FIGS. 35 and 36, the one or more bracket assemblies 450' are disposed in interconnected relation adjacent opposite sides of the frame of the mobile support assembly 400' by means of a tie rod 118'. The tie rod 118' includes two opposite ends 118" which are connected to or at least partially defined the respective pivot connections 459' as clearly represented in FIG. 6.

It is further emphasized that the disposition and structure of the tie rod 118' in combination with the pivot connections 459' associated with each of the one or more bracket assemblies 450' are such as to facilitate a movement of the two bracket segments 454 and 456 of each of the one or more bracket assemblies 450'. Such movement or positioning of the bracket segments 454 and 456 is schematically indicated by directional arrows 510 indicating the positioning of the one or more bracket assemblies 450' from at least the operative orientation as represented in FIG. 36 to a stored orientation generally represented in FIG. 34. For purposes of clarity it is also emphasized that the bracket assembly 116*a*, in the embodiments of FIGS. 7 and 8 described, is approaching the stored orientation where corresponding bracket segments assume a folded relation to one another. More specifically, the operative orientation of each of the one or more bracket assemblies 450' and the corresponding bracket segments 454 and 456 is at least partially at least partially defined by a substantially linearly aligned relation between the two bracket segments 454 and 456. In contrast the stored orientation of the one or more bracket assemblies 450' is at least partially defined by the corresponding bracket segments 454 and 456 disposed in and at least partially folded relation as described with reference to the embodiment of FIG. 34, set forth above.

The disposition and structure of the tie rod 118' is such that an upward or outward force, normally exerted manually on the tie rod 118', will result in the bracket segments 454 and 456 being positioned from the operative orientation of FIG. 36 to the stored orientation as represented in FIG. 34 once the lock assembly 452' is displaced from its retaining relation with the corresponding bracket segments as in FIG. 36. Further similarities of this embodiment, as compared with the embodiment of FIGS. 33 and 34, includes the provision of the lock assembly generally indicated as 452'. As with the embodiment of FIGS. 33 and 34, the lock assembly 452' includes a male structure 464 preferably comprising a spring biased locking pin or spring biased finger 464'. The male structure 464 is disposed on and movable with one of the two bracket segments, as at 454. However, the lock assembly 452' differs from the embodiment of FIGS. 33 and 34 by including two female structures 462 and 463 each disposed on and movable with the other one of the two bracket segments, as at 456. In addition, each of the one or more lock assemblies 452' includes the second or additional female structure 463 similar to but disposed in spaced relation to the first or other female structure 462.

Accordingly, each of the female structures 462 and 463 are formed on a common one of the two bracket segments, as at 456, and each may be more specifically defined by an aperture, hole or opening 462' and 463' formed through the corresponding bracket segment 456. As such each of the female structures 462 and 463 is disposed and dimensioned to eventually become aligned with and receive the protruding pin or finger 464' (see FIG. 34) of the male structure 464. Therefore, the male structure 464 is disposable into removable but retaining engagement with the bracket segment 454 and 456. The provision of two female structures 462 and 463 and the corresponding aperture, hole, opening, etc. 462' and 463' facilitate the locking assembly 452' and more specifically, the male structure 464 to be disposed in retaining engagement with the two, corresponding brackets 454 and 456 whether the brackets are in the operative orientation as represented in FIG. 36 or the folded orientation as represented and described with regard to the embodiment of FIG. 34.

Accordingly, with at least partial reference to FIG. 34, when the two bracket segments 454 and 456 are in the folded orientation as represented in FIG. 34, the male structure 464 and the pin or finger 464' thereof passes through the aperture 462' which is defined as part of the female structure 462. However, when in the operative position represented in FIG. 36, the male structure 464 and the penetrating pin or finger thereof 464' passes through the aperture, opening or hole 463' defining a part of the other female structure 463. As such, the two female structures 462 and 463 are disposed on opposite sides of the pivot connection 459' which may or may not be at least partially defined by the end 118" of the tie rod 118'.

Yet another feature of the present invention is the provision of an activation assembly generally indicated as 500 in FIGS. 35 through 37. More specifically, the activation assembly 500 may include an elongated handle 502 having a grip or grasping portion 504. As such, the elongated handle 502 may be of sufficient length to displace the one or more lock assemblies 452'. Further in at least the embodiment of FIG. 36, the displacement of the one or more lock assemblies 452' from a retaining engagement with the corresponding bracket segments 454 and 456, by the handle 502, will concurrently drive or moving the tie rod 118' in an upward and/or outward direction. In turn, such a driving or forced movement of the tie rod 118' will facilitate movement of the one or more bracket assemblies 450' at least from the operative orientation of FIG. 36 to the stored orientation of FIG. 34 and/or FIGS. 7 and 8.

As set forth above, the operative orientation of each of the one or more bracket assemblies 450' is at least partially defined by the respective bracket segments 454 and 456 disposed in a substantially linear aligned relation to one another as represented in FIG. 36. Further, the stored orientation as generally represented in FIGS. 7 and 8 and more specifically in FIG. 34 is defined by the corresponding bracket segments 454 and 456 of each of the one or more bracket assemblies 450' being disposed in a substantially folded relation to one another. As such, the male structure 464 of each of the one or more lock assemblies 452' is disposed in retaining engagement with the female structure 463 when the one or more bracket assemblies 450' are in the operative orientation. In contrast, when in the stored orientation, the male structure 464 and more specifically, the penetrating finger or pin 464' thereof is disposed in retaining engagement with the other of the two female structures, as at 463, 463'.

Again with primary reference to the embodiment of FIG. 36, more operative and structural features associated with the activation assembly 500 include it being connected to each of the one or more lock assemblies 452' associated with each of the one or more brackets 450'. As such, any of a variety of different type of connector structures 505 such as, but not limited to, a D-ring connector may serve to interconnect a correspondingly disposed end 502' of the handle 502 with the male structure 464 of the one or more lock assemblies 452'. Accordingly, when an upward or outward force is manually exerted on the activation assembly 500 and/or handle 502, as schematically represented by directional arrow 510, the male structure 464 will be released from the correspondingly disposed and aligned female structure, as at 463, 463'. Substantially concurrently, the end 118" of tie rod 118' will have an upwardly or outwardly directed force exerted thereon due to the provision of a link assembly 508. The link assembly 508 is disposed in interconnecting relation between the tie rod 118', as at or about the end 118" and is also interconnected to the male structure 464 of the one or more lock assemblies 452'. Further, the link assembly may be connected directly to the male structure 464 be connected to or otherwise associated with the connection 505.

Accordingly, when an upward or outward force is exerted on the handle 502, as schematically represented by directional arrow 510, the connector 505 will serve to displace the male structure 464 from retaining engagement with the corresponding female structure 463 and thereby displace the male structure 464 from retaining engagement with the corresponding bracket segments 454 and 456. Substantially concurrently the upward or outward force exerted on the handle 502 will be transferred to the end 118" of the tie rod 118' by virtue of the interconnecting link 508. Therefore, once the male structure 464 of the lock 452' is displaced from its retaining engagement with the brackets 454 and 456, the tie rod 118' will also be raised or otherwise appropriately positioned to cause a driving movement of the two bracket segments 454 and 456 from their operative orientation, as represented in FIG. 36, to the folded orientation as represented in FIG. 34 (as well as FIGS. 7 and 8).

With primary reference to FIG. 37, another preferred embodiment of the present invention includes the absence of a tie rod 118 from the frame 402'. Accordingly, in the embodiment of FIG. 37, an outward or upward pulling force, as indicated by directional arrow 510, will result in displacement of the male structure 464 from the aligned and penetrated female structure 463, 463'. This will remove the male structure 464 and the corresponding lock assembly 452' from its retaining engagement with corresponding ones of the two bracket segments 454 and 456. Moreover, in the embodiment of FIG. 37, the absence of the tie rod 118' will therefore eliminate the need of the aforementioned link assembly 508, as should be obvious.

Other structural features of the one or more preferred embodiments associated with FIGS. 35 through 37 include the activation assembly 500 and the handle 502 being formed of a substantially elongated, flexible material, such that the activation assembly 500 can be easily positioned in out of the way location on or within the support assembly 400'. Also, the length of the handle 502 should be sufficient so as to allow an operator to access and manually exert an upwardly or outwardly directed pulling force on the grip or grasping portion 504, while the operator maintains or is disposed in a substantially upright orientation. The ability of the operator to maintain a substantially or at least partially upright orientation will eliminate the necessity of the operator bending, stooping, kneeling or otherwise assuming an uncomfortable position in order to access the one or more male structures 464 by a direct touching, contacting or other manual accessing the male structure 464 of the one or more lock assemblies 452'.

It is again emphasized that the mobile support assembly 400' can be used with a single bracket assembly 450' or two such bracket assemblies 450' located on opposite sides of the frame 402' of the mobile support assembly 400'. Also, when two bracket assemblies 450' are utilized there need be only a single lock assembly 452' utilized in association with one of the two bracket assemblies 450'. Alternatively, two separate lock assemblies 452' can be utilized with each of the two bracket assemblies 450'. Similarly with the embodiment of FIG. 37, whether a tie rod 118' is utilized or not, one lock assembly 452' may be utilized with a single one of the bracket assemblies 450" or each of two bracket assemblies 450" when two of such brackets 450" are in fact used with the mobile support assembly 400'. Therefore, each of the two opposite ends 502' of the handle 502 of the activation assembly 500 may be connected to corresponding ones of the lock assemblies 452', when one or more of the lock assemblies 452' are in fact utilized.

Figure 38:
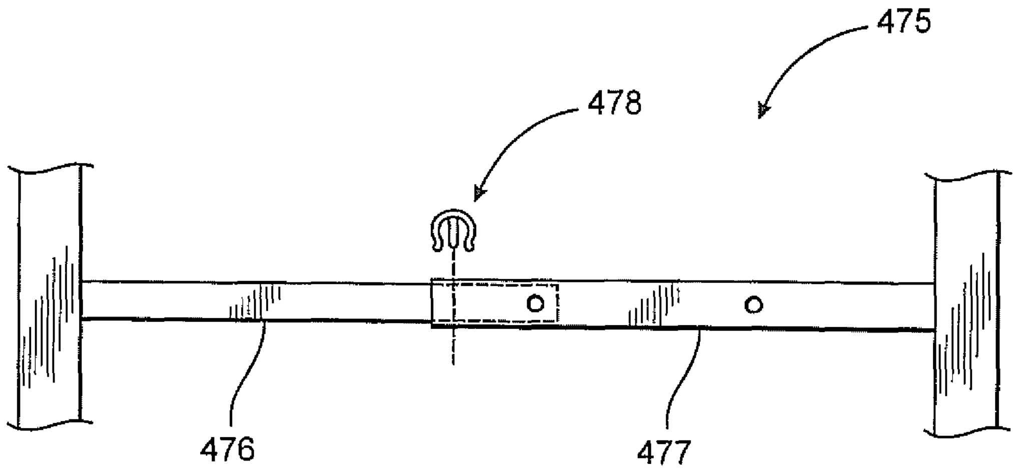
FIGS. 38-40 illustrate an additional preferred embodiment directed to a mobile support assembly with an adjustable width frame.
Figure 39:
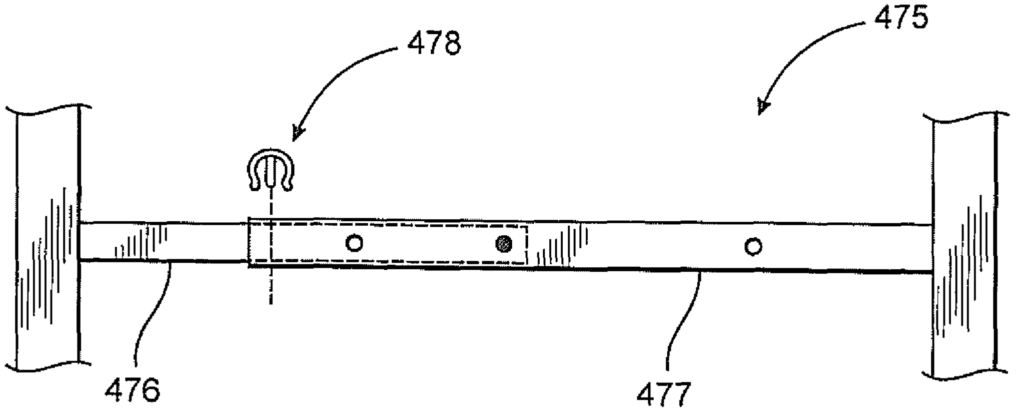
Figure 40:
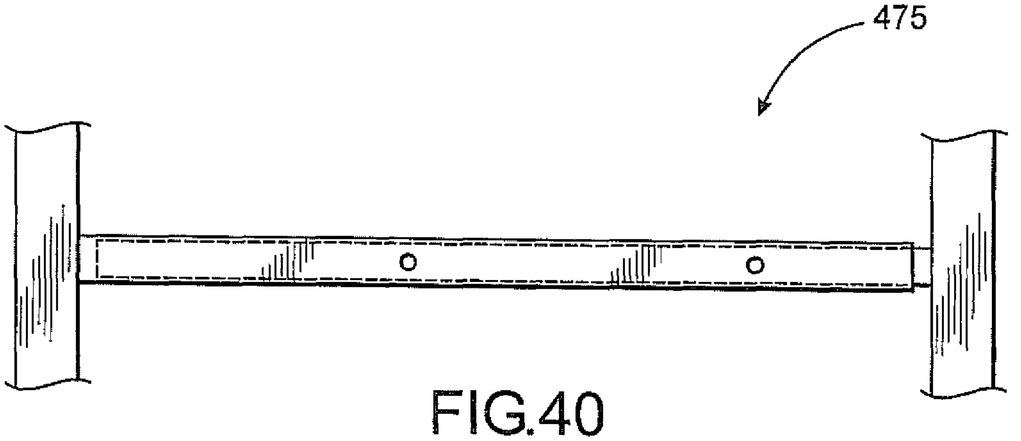

As previously recited, an important advantage of the structure of the present invention is its ability to undertake a substantially small and compact orientation for packaging. Such a compact orientation provides for reductions in packaging sizes that in fact result in significant benefits and advantages related to shipping costs, storage space requirements, and shelf space requirements within a store. Therefore, as yet another embodiment of the present invention, adjustable cross members 475 are provided on the frame, such as for example on frame 402, and are configured to provide a variable width to the mobile support assembly. More specifically, as illustrated in FIGS. 38-40, the cross members 475 have a telescoping configuration so as to effectively reduce an overall width of the mobile support assembly. In the preferred, illustrated embodiments, the cross member comprises a pair of segments 476 and 477 that telescope within one another. Although it is contemplated that additional segments may be incorporated so as to provide even more variability in the overall width, so as to provide the greatest degree of support to a user, the preferred illustrated embodiment incorporating the pair of segments 476 and 477 is preferred, although not required. Moreover, it is recognized that in addition to narrowing the frame so as to achieve a more compact configuration, the adjustable cross members also provide for a widening so as to accommodate a user, and indeed can widen beyond a standard width to accommodate individuals requiring a greater wheel base or seating area for improved comfort. Further, although a variety of different locking structures may be incorporated, including a mere frictional fit, screw, clamp, stopper, clip, etc., in the illustrated embodiment, a retaining connector 478, preferably similar to the retaining connector or bracket 220, is provided so as facilitate easy adjustability and a secure connection when the desired width is found. Along these lines, one or more alignable holes may be provided in the segments 476, 477 so as to allow for variable spacing. By way of example in only, in a bariatric product, it may be preferred to provide a 17 inch wide configuration for packaging and shipping, with a 19 inch standard and/or a 23 inch wide configuration available by adjusting the width of the cross members 475. Similarly, in one embodiment of a more standard mobility device, a very compact 14 inch may be provided for shipping, with adjustability to a 19 inch configuration for use.

Figure 41:
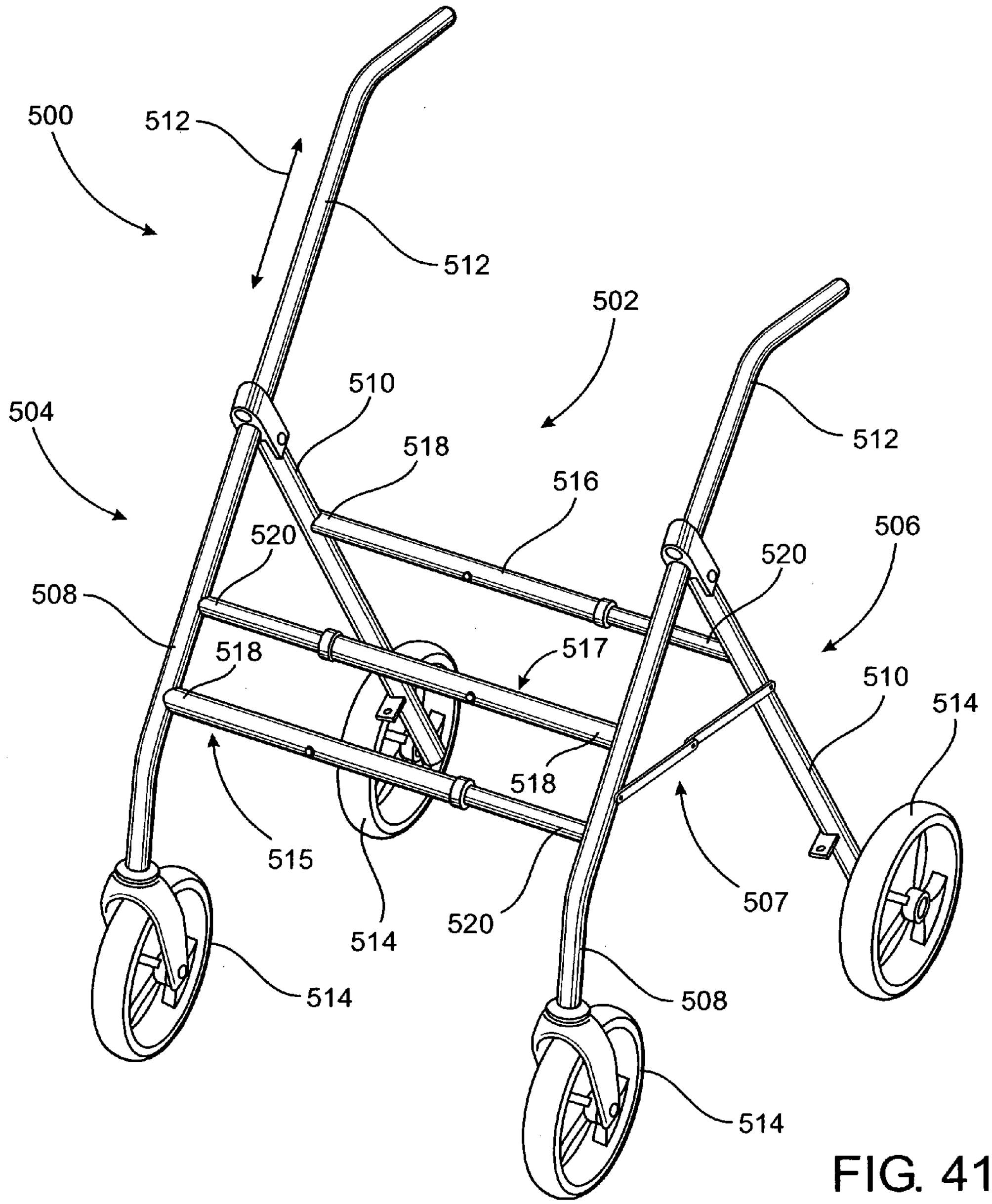
FIG. 41 is a perspective view of yet another preferred embodiment of the present invention incorporating an adjustable width frame at least partially similar to the embodiment of FIGS. 38-40.

With primary reference to FIGS. 41-47, an additional preferred embodiment of a mobile support assembly is generally indicated as 500. Structural modifications incorporated in the mobile support assembly 500 are at least partially demonstrated in the embodiments of FIGS. 1-40. Further, the embodiment of FIGS. 38-40 relating to the adjustability of the overall width of the frame 502 is further developed, wherein the frame 502 is easily and quickly allowed to assume the aforementioned and described stored orientation. However, as represented in FIG. 41 mobile support assembly 500 is represented in an at least partially assembled, operative orientation as versus the stored orientation as at least partially represented in FIG. 40.

Accordingly the frame 502 of the mobile support assembly 500 includes a front leg assembly generally indicated as 504 and a rear leg assembly generally indicated as 506. The front and rear leg assemblies are movably interconnected to one another by virtue of at least one pivotal or partially rotational connecting link 507. Further, the front leg assembly 504 includes two spaced apart front legs 508 and the rear leg assembly 506 includes two spaced apart rear legs 510. Also, two handles or outwardly disposed frame extensions 512 are adjustably connected to the remainder of the frame 502, such as to the corresponding front legs 508 of the front leg assembly 504. The structuring and movable interconnection between the handles and/or frame extensions 512 and the remainder of the frame 502 is such as to allow an inwardly and outwardly adjustable positioning thereof as indicated by directional arrow 512'. The movable interconnection and adjustable positioning of the handles 512 relative to the remainder of the frame 502 is equivalent or substantially similar to the structure represented in FIG. 19 and described above.

In addition, each of the front leg assembly 504 and rear leg assembly 506 includes a plurality of wheels, rollers or like structures 14 connected to the lower portions or ends of the corresponding front and rear legs 508 and 510. As a result, the frame 502 is rendered mobile when in the operative orientation of FIG. 41. As should be apparent, the wheels 514 are disposed and structured to movably support the frame 502 relative to any of a variety of different surfaces over which the mobile support assembly 500 travels.

As set forth above, the mobile support assembly 500 and the frame 502 may be selectively disposed in either the operative orientation represented in FIG. 41 or the stored orientation at least partially represented in FIGS. 8, 22 and 40. Accordingly, the stored orientation may be at least partially defined by the width of the frame 502 being reduced at least in terms of the space between the front legs 508 as well as the space between the rear legs 510 being reduced. As a result, the overall dimensions and configurations of the frame 502 is made to be more compact to facilitate storage, transportation, shipping, etc. As described with reference to the above noted embodiments, the stored orientation may be additionally defined by the compact configuring of the frame 502 in a manner represented throughout the pertinent accompanying Figures.

Figure 42:
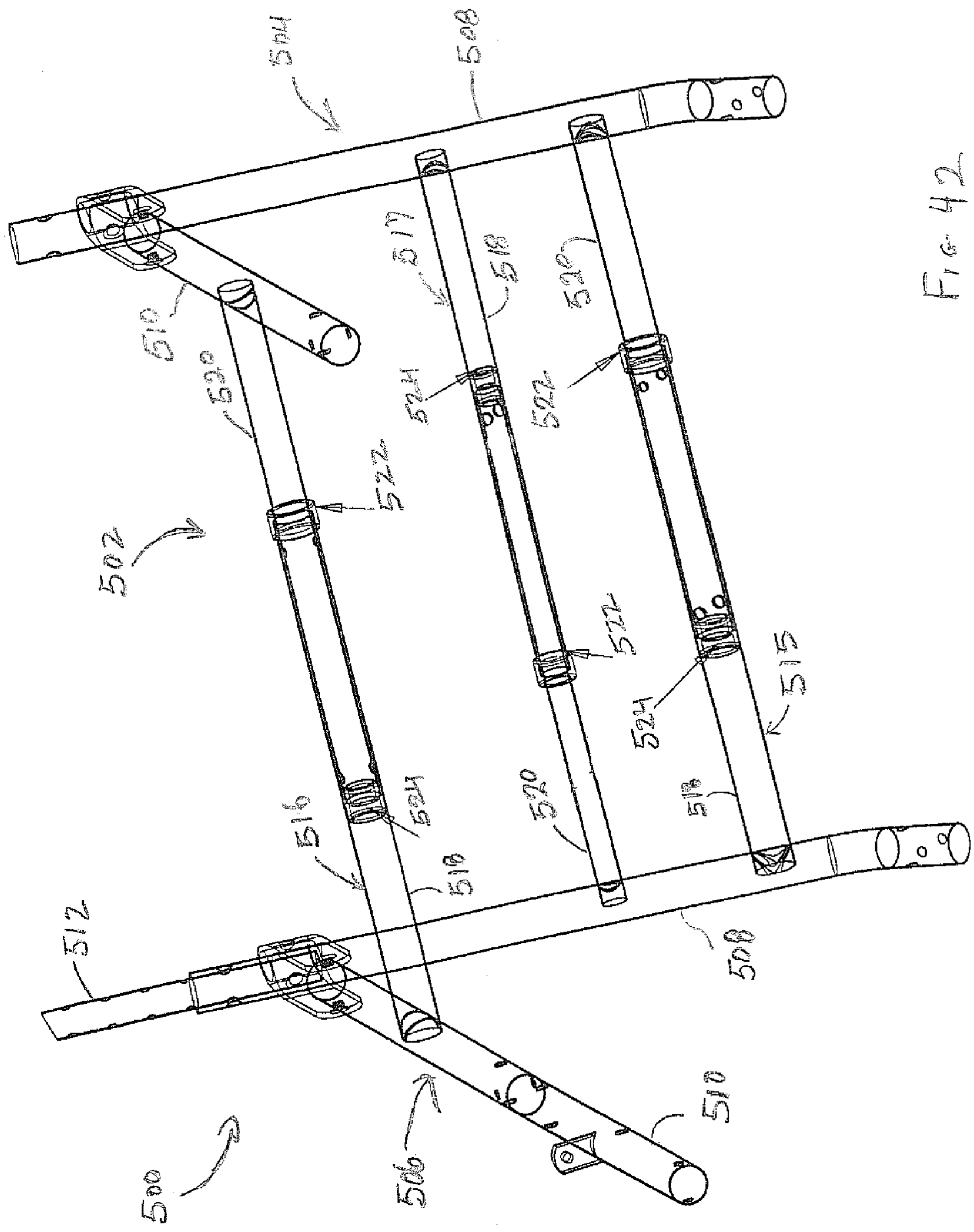
FIG. 42 is a perspective view in partial schematic and cutaway of a portion of the embodiment of FIG. 1.

Therefore, at least one feature of the mobile support assembly 500, specifically including the frame 502, is the provision of at least one cross member connected to and extending between the associated legs of either the front wheel assembly 504 or the rear assembly 506. However, in a more practical application as represented in FIGS. 41 and 42, at least one front cross member 515 is connected to and extends between the front legs 508 and at least one additional rear cross member 516 is connected to and extends between the rear legs 510. In order to provide additional stability and structural integrity to the frame 502, at least one of the front leg assembly 504 and/or the rear leg assembly 506 may include a plurality of cross members 515 and 517, as represented. Each of the cross members 515, 516 517 include a variable length construction which facilitates the variable adjustment of the length of each of the cross members 515-517. A quick and easy adjustment of the width of the frame 502 is thereby facilitated by virtue of varying the space between the front legs 508 concurrently to the varying of the space between the rear legs 510. The specific structural features at least partially defining the variable length construction of the cross members 515-517 include each being formed of a plurality of preferably at least two segments movably interconnected to one another.

More specifically, front and rear cross members 515 and 516, as well as the additional cross member 517, each include an outer segment 518 and an inner segment 520 movably interconnected in substantially coaxial relation to one another so as to define a movable, telescoping interconnection. Moreover, the telescoping connection allows for relative longitudinal positioning movement or of each of the outer and inner segments 518 and 520 of a common one of the cross members 515, 516 and 517. By virtue of this longitudinal, coaxial movement of the outer and inner segments 518 and 520, the length of the respective cross members may be varied. This variable length construction facilitates the adjustment of the width of the frame 502 and more specifically the spacing between the front legs 508 as well as the spacing between the rear legs 510. Due to the fact that each of the front and rear leg assemblies 504 and 506 preferably include at least one cross member therebetween, the spacing between the front legs 508 and the spacing between the rear legs 510 will be concurrently adjusted, as should be apparent.

Additional structural features of each of the cross members 515-517 include a connecting and/or locking assembly comprising a plurality of locking points extending along the length of the respective cross members 515-517. Accordingly, relative movement between corresponding ones of the outer and inner segments 518 and 520 as well as the spacing between the front legs 508 and the spacing between the rear legs 510 may be at least temporarily "locked" in either the operative or stored orientations. This connecting or locking assembly is substantially similar or equivalent to the structures represented in FIGS. 10-12 and 30-32, as described above.

Additional structural and operative features of the mobile support assembly 500 include the provision of a stabilizing assembly associated with at least one but preferably all of the cross members 515-517. As will be explained in greater detail hereinafter, the stabilizing assembly serves to provide a movable yet stable, high strength and substantially "rattle-free" interconnection of the outer and inner segments 518 and 520 of each of the cross members 515-517. With primary reference to FIGS. 42-47, the stabilizing assembly comprises a plurality of bushings and preferably at least two bushings 522 and 524 associated with each of the cross members 515-517. Each of the plurality of at least two bushings 522 and 524 are formed from an at least partially flexible and/or elastic material and are dimensioned and configured to accommodate the structure of the outer and inner segments 518 and 520 of each of the cross members 515-517.

More specifically, individual ones of first bushings 522 are secured to an outer segment 518 of each of the cross members 515-517, preferably at an end portion thereof, as demonstrated in FIGS. 42 and 47. As such, the first bushing 522 is disposed exteriorly of both the outer segment 518 and inner segment 520 of each of the cross members 515-517. In addition, the first bushing 522 includes oppositely disposed open ends 522' and 522" which at least partially define a central passage or channel 523 within the interior of the first bushing 522. As such, the overall dimension and configuration of the first bushing 522 is such as to surround and slidingly engage the exterior surface of a corresponding one of the inner segments 520 associated with the cross member 515-517 with which each of the first bushings 522 are associated. Such sliding engagement facilitates the stable, secure, "rattle-free" movable interconnection of the inner and outer segments 518 and 520 respectively of each of the cross members 515-517.

Somewhat similarly, the second bushing 524 of the stabilizing assembly is connected to the inner segment 520, preferably at one end thereof as represented in FIGS. 42 and 45. Similar to the structuring of the first bushing 522, the second bushing 524 may include oppositely disposed open ends 524' and 524" defining a central passage or channel 525. Moreover, the exterior dimensions of the second bushing 524 is such as to fit within the interior of the outer segment 518 of the particular cross member 515-517 with which it is associated. Further, the exterior peripheral surfaces, as at 527 of each of the plurality of second bushings 524 is disposed, dimensioned and configured to slidingly engage the interior surface of a correspondingly disposed one of the outer segments 518 of the particular cross member 515-517 with which the second bushing 524 is associated.

Therefore, the stabilizing assembly comprising the plurality of bushings such as first bushing 522 and second bushing 524 associated with each of the cross members 515-517 serve to collectively establish a movable, stable, relatively high strength connection which is "rattle-free". Each of the cross members 515-517 are therefore selectively adjustable along their length. In turn, the width of the frame 502 of the mobile support assembly 500 can be selectively disposed between the operative orientation as represented in FIGS. 41 and 42 and the stored orientation as at least partially represented in FIG. 40.

Many variations and modifications may be made to the above-described embodiments, without departing from the spirit, principles and intended scope of theses embodiments. Since many modifications, variations and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A mobile support assembly structured to facilitate travel of an individual over a supporting surface, said support assembly comprising:

a frame selectively disposable between an operative orientation and a stored orientation, said frame including a front leg assembly and a rear leg assembly movably interconnected and disposable relative to one another between said operative and stored orientations, said front leg assembly including two front legs disposed in spaced relation to one another and at least one front cross member connected to and extending between said two front legs, said rear leg assembly including two rear legs disposed in spaced relation to one another and at least one rear cross member connected to and extending between said two rear legs, said front and rear cross members each comprising a variable length construction structured to facilitate a concurrently adjustable spacing between said two front legs and said two rear legs, said variable length construction comprising each of said front and rear cross members including at least two movably interconnected segments, said two segments of each of said front and rear cross members movably disposed in coaxial relation to one another and including an outer segment and an inner segment disposed in telescoping relation to one another; said two segments longitudinally disposable relative to one another to facilitate said concurrently adjustable spacing between said two front legs and said two rear legs and disposition of said frame between said operative and stored orientations, and each of said front and rear cross members including a stabilizing assembly comprising a first bushing and a second bushing respectively connected to and movable with corresponding ones of said outer segment and said inner segment.

2. A mobile support assembly as recited in claim 1 wherein said first bushing of each stabilizing assembly is disposed exteriorly of and in sliding engagement with a corresponding one of said inner segments.

3. A mobile support assembly as recited in claim 2 wherein said second bushing of each of said stabilizing assemblies is disposed interiorly and in sliding engagement with a corresponding one of said outer segments.

4. A mobile support assembly as recited in claim 1 wherein said first bushing of each of said stabilizing assemblies is disposed in surrounding relation to a corresponding one of said inner segments and in sliding engagement with a length of an exterior surface thereof.

5. A mobile support assembly as recited in claim 4 wherein said second bushing of each of said stabilizing assemblies is disposed in enclosed relation to a corresponding one of said outer segments and in sliding engagement with a length of an interior surface of said corresponding outer segment.

6. A mobile support assembly as recited in claim 1 further comprising a front wheel assembly and a rear wheel assembly respectively connected in supporting relation to said front leg assembly and said rear leg assembly.

7. A mobile support assembly as recited in claim 6 said stored orientation further comprising at least one of said front or rear leg assemblies including a lower portion disposable into a non-operative storage position and thereby at least partially defining a reduced longitudinal dimension of said frame.

8. A mobile support assembly as recited in claim 1 wherein said stored orientation is at least partially defined by said frame having a compact configuration, said compact configuration comprising a reduced length of said front and rear cross members and a closer spacing between said two front legs and two rear legs.

9. A mobile support assembly as recited in claim 1 wherein said two segments of each of said front and rear cross members include a plurality of locking points, at which they are secured to one another, said locking points oriented to revive both an increase and decrease in the length of said front and rear cross members.

10. A mobile support assembly as recited in claim 1 wherein at least one of said front and rear leg assemblies include a plurality of cross members, each of said plurality of cross members comprising a variable length construction structured to facilitate a concurrent adjustable spacing between said two front legs and said two rear legs.

* * * * *